United States Patent
Yu

(10) Patent No.: US 12,462,530 B2
(45) Date of Patent: Nov. 4, 2025

(54) OPTIMIZED SINGLE SHOT DETECTOR (SSD) MODEL FOR OBJECT DETECTION

(71) Applicant: ACCENTURE GLOBAL SOLUTIONS LIMITED, Dublin (IE)

(72) Inventor: KeYong Yu, Singapore (CN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 406 days.

(21) Appl. No.: 18/089,663

(22) Filed: Dec. 28, 2022

(65) Prior Publication Data
US 2024/0221361 A1  Jul. 4, 2024

(51) Int. Cl.
G06V 10/764 (2022.01)
G06V 10/77 (2022.01)
G06V 10/82 (2022.01)

(52) U.S. Cl.
CPC ........ *G06V 10/765* (2022.01); *G06V 10/7715* (2022.01); *G06V 10/82* (2022.01); *G06V 2201/07* (2022.01)

(58) Field of Classification Search
CPC .. G06V 10/765; G06V 10/7715; G06V 10/82; G06V 2201/07
See application file for complete search history.

(56) References Cited

U.S. PATENT DOCUMENTS

| | | | |
|---|---|---|---|
| 12,033,070 B2 * | 7/2024 | Li | G06N 3/08 |
| 2023/0142455 A1 * | 5/2023 | Nakao | G06N 20/00 706/12 |

OTHER PUBLICATIONS

Liu et al, "SSD: Single Shot MultiBox Detector", 2016, Computer Vision—ECCV 2016 (17 Pages) (Year: 2016).*

(Continued)

*Primary Examiner* — David F Dunphy
(74) *Attorney, Agent, or Firm* — Mannava & Kang, P.C.

(57) ABSTRACT

Systems and methods for optimizing single shot detector (SSD) for object detection are disclosed herein. A system receives an image of a plurality of objects. Further, the system determines a plurality of feature layers and a plurality of feature cell sizes corresponding to the received image, based on an aspect ratio of the received image. Furthermore, the system determines aspect ratio of anchor boxes from trained model file, based on aspect ratio of anchor boxes, position and number of anchor boxes to be tiled in each feature cell of the plurality of feature layers. The size of the one or more anchor boxes corresponds to an anchor box aspect ratio. Additionally, the system assigns the one or more anchor boxes as a horizontal tile or a vertical tile in each feature cell, when the anchor box aspect ratio is less than a first pre-defined threshold value and greater than a second pre-defined threshold value, respectively. Further, the system generates one or more feature maps using an object detection model and a neural network (NN) model. The one or more feature maps comprises one or more feature map tensors. Furthermore, the system generates, for each layer of the one or more feature maps, a prediction tensor of predefined dimension from the one or more feature map tensors, using a prediction convolution layer. Additionally, the system detects and classifies the plurality of objects, based on the generated prediction tensor.

20 Claims, 13 Drawing Sheets

(56) References Cited

OTHER PUBLICATIONS

Sheng et al, "Single-Shot Oriented Scene Text Detector With Learnable Anchors", 2019, IEEE International Conference on Multimedia and Expo (ICME), pp. 1516-1521 (Year: 2019).*
Arpytanshu, "ssd-object-detection", May 5, 2020, 5 pages. <https://github.com/arpytanshu/ssd-object-detection>.
Parv Gupta, "Use Computer Vision for Product Detection on a Grocery Shelf", Apr. 22, 2021, 36 pages. <https://levelup.gitconnected.com/product-detection-from-grocery-shelf-9db031e0ddc1>.
Ankit Sinha et al., "An Improved Deep Learning Approach for Product Recognition on Racks in Retail Stores", Feb. 26, 2022, 13 pages. <https://www.researchgate.net/publication/358919351_An_Improved_Deep_Learning_Approach_For_Product_Recognition_on_Racks_in_Retail_Stores>.
Empathy87, "nn-grovery-shelves", Jun. 4, 2018, 4 pages. <https://github.com/empathy87/nn-grocery-shelves>.
Prabu Selvam et al., "A Deep Learning Framework for Grocery Product Detection and Recognition", May 24, 2022, 39 pages. <https://assets.researchsquare.com/files/rs-1431986/v1/47ff346e-6967-479c-b60a-1501b49f1ba1.pdf?c=1653407301>.
Chandra411, "Product-Detection", Jun. 28, 2020, 4 pages. <https://github.com/chandra411/Product-Detection>.
Darshankumar Patel, "Single Shot Detector for Object Detection using an Ensemble of Deep Learning and Statistical Modelling for Robot Learning Applications", Thesis paper, year 2020, 107 pages.
Raotnameh, "SSD-single-shot-detector", May 24, 2020, 4 pages. <https://github.com/raotnameh/SSD-single-shot-detector/blob/master/README.md>.
Lilian Weng, "Object Detection Part 4: Fast Detection Models", Lil'Log, Dec. 27, 2018, 18 pages. <https://lilianweng.github.io/posts/2018-12-27-object-recognition-part-4/>.
Cross Validated, "Why use multiple anchor boxes with the same positions in a multi-box detector?", downloaded from the Internet on Oct. 25, 2022, 2 pages. <https://stats.stackexchange.com/questions/490895/why-use-multiple-anchor-boxes-with-the-same-positions-in-a-multi-box-detector>.

* cited by examiner

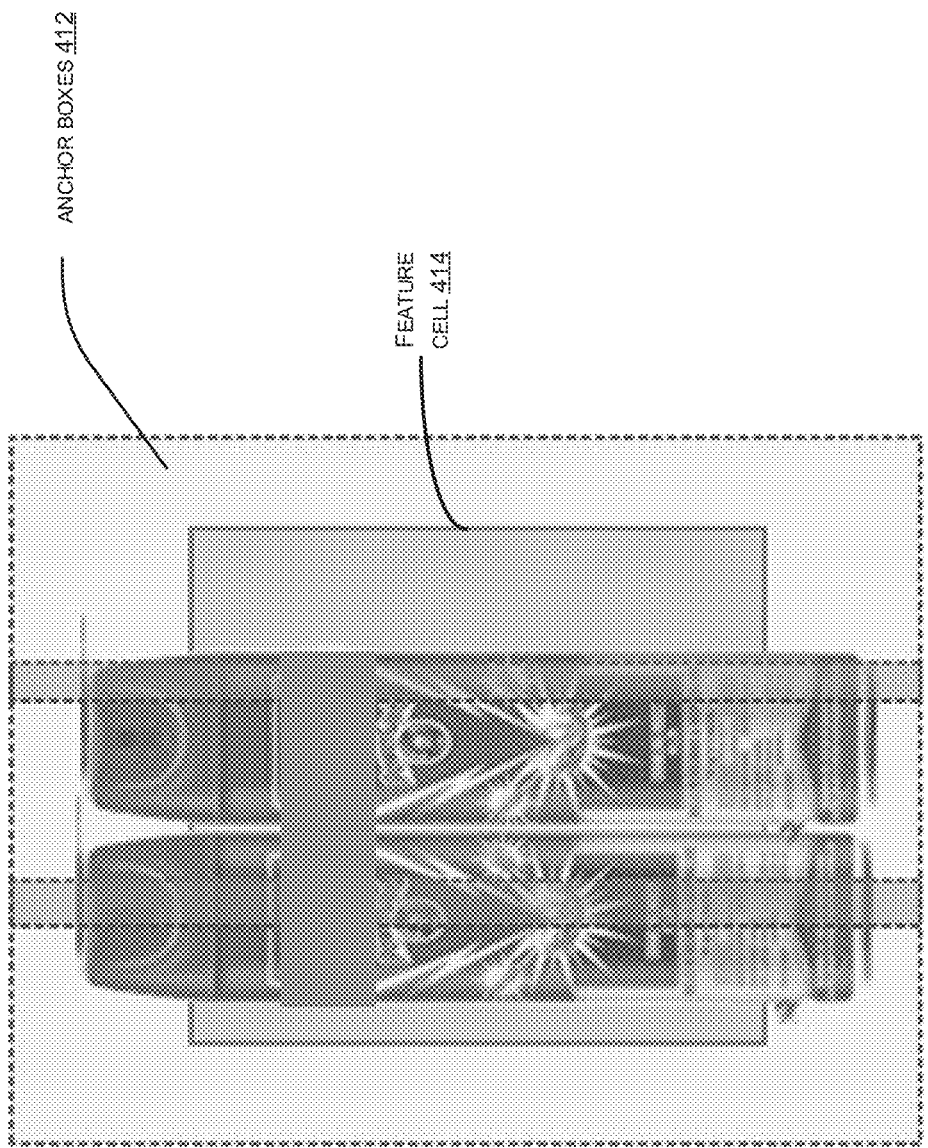

OPTIMIZED SINGLE SHOT DETECTOR (SSD) MODEL FOR OBJECT DETECTION

BACKGROUND

Generally, different types of stock-keeping units (SKUs) on a shelf may include large objects, small objects, long objects, narrow objects, and the like. Regardless of the type of object, the objects may need to be detected with a detection rate of at least 98% without missing the detection of any object or slim, flat tightly packed SKU in a typical scenario. Further, the object detection application may need to run speedily on mobile devices available at reasonable prices and with modest computing resources. To speed up object detection using the object detection application, mobile devices may implement a standard single shot detection (SSD) method. The standard SSD method may use anchor boxes for detecting object classes during the object detection in an image of the SKU. Each anchor box may be used to detect one object.

Further, in case, the SKU includes slim and tightly packed objects, the anchor boxes may miss out detection of all objects. Further, in case, the slim objects are tightly packed together, rate of object detection (i.e., recall rate) may be low, when the anchor boxes are used in the standard SSD. For example, a standard SSD may use 6 anchor boxes per feature cell of the image, with an aspect ratio such as 1, 1/2, 1/3, 2, 3, and an extra compensation box. The anchor boxes may be placed in the center of the feature cell. However, in a scenario where slim/flat and tightly packed objects are present in the image, the object detection of the standard SSD method may not be accurate enough, for example, one object may be detected and other objects may be missed. In addition, each feature cell may usually be square in shape. The square-shaped feature cell may not be practical to resize to different aspect ratios (width and height), as the processing will increase linearly. Further, the anchor boxes are generated on a feature map with each pixel as the anchor box center. Due to a fixed size or shape of the anchor boxes, a plurality of anchor boxes is generated for a plurality of objects on a plurality of feature maps per layer of the image. To process a plurality of feature maps, the processing power needs to be high, which in turn leads to high computational cost. Further, due to fixed size or shape of anchor boxes, which are not resized according to the shape of the objects, the object detection rate may be approximately 60-70% for slim, tightly-packed objects in the SKUs. Such low object detection rate may be due to the slim, tightly-packed objects that may not be bounded within/over covered using the anchor boxes.

Conventional SSD-based object detection methods for detecting objects in the image may not yield high accuracy particularly with respect to the slim/flat tightly packed objects in the SKUs. Further, other conventional methods may provide a faster region-based convolutional neural networks (R-CNN) based object detection method, for detecting objects in the image. However, the faster R-CNN may need more computational resources which may be available in expensive mobile devices, and the faster R-CNN may require more object detection time. Further, conventional methods may use a Yolo method for object detection that may include more localization errors during the object detection.

Therefore, there is a need for systems and methods for addressing at least the above-mentioned problems in the existing approaches by providing an optimized single-shot detector (SSD) model for object detection.

SUMMARY

An embodiment of present disclosure includes a system, the system receives an image of a plurality of objects. Further, the system determines a plurality of feature layers and a plurality of feature cell sizes corresponding to the received image, based on an aspect ratio of the received image. Furthermore, the system determines an aspect ratio of one or more anchor boxes from a trained model file, based on the aspect ratio of one or more anchor boxes, a position and a number of the one or more anchor boxes to be tiled in each feature cell of the plurality of feature layers. The number of one or more anchor boxes to be tiled is based on the aspect ratio of the one or more anchor boxes and the plurality of feature cell sizes. Additionally, the system assigns the one or more anchor boxes as a horizontal tile or a vertical tile in each feature cell, when the anchor box aspect ratio is less than a first pre-defined threshold value and greater than a second pre-defined threshold value, respectively. Further, the system generates one or more feature maps using an object detection model comprising a neural network (NN) model. The one or more feature maps comprises one or more feature map tensors. Furthermore, the system generates, for each layer of the one or more feature maps, a prediction tensor of a predefined dimension from the one or more feature map tensors, using a prediction convolution layer. For each layer of the one or more feature maps, the prediction convolution layer is created based on each feature cell size, the position of the one or more anchor boxes, and the aspect ratio of the one or more anchor boxes. Additionally, the system detects and classifies the plurality of objects, based on the generated prediction tensor.

Additionally, the system further annotates the received one or more images, by creating one or more bounding boxes in the one or more images, using an annotation tool. For example, the annotation tool may be used during the training process of the system. Further, the system computes an aspect ratio of the one or more bounding boxes, the plurality of feature layers, and the plurality of feature cell sizes. The one or more bounding boxes may provide a point of reference information for an object detection. The point of reference information is captured using the annotation tool. Furthermore, the system determines, for the one or more bounding boxes, an aspect ratio of the one or more anchor boxes, and determines, based on the aspect ratio of the one or more anchor boxes, a position and a number of the one or more anchor boxes to be tiled in each feature cell of the plurality of feature layers, based on annotations from the annotation tool. Further, the system generates one or more feature maps using the NN model and generates the prediction tensor of the pre-defined dimension, using the prediction convolution layer. Additionally, the system creates a ground true tensor with dimension and assign an object class and location to the ground true tensor, upon assigning the one or more anchor boxes as the vertical tile or the horizontal tile in each feature cell. Further, the system calculates a loss of classification of the object class, using the prediction tensor and the ground true tensor. Furthermore, the system transmits the calculated loss and learning rate to the prediction convolution layer and the NN model to adjust trainable weight in the prediction convolution layer and the NN model. Further, the system exports a precise check point in trained data using the adjust trainable weight, to a model file.

Further, for each feature layer of the generated feature map, the system creates at least one of a depth-wise prediction convolution layer and a point-wise prediction convolution layer with an expand factor. Furthermore, the system connects at least one of the depth-wise prediction convolution layer, and the point-wise prediction convolution layer to the one or more feature map tensor. Additionally, the system obtains the prediction tensor of the pre-defined dimension for each feature layer.

Furthermore, for each anchor box of a different aspect ratio, when the anchor box aspect ratio is between the first pre-defined threshold value and the second pre-defined threshold value, the system assigns an anchor-box at center of the feature cell. Further, when the anchor box aspect ratio is less than the first pre-defined threshold value or greater than the second pre-defined threshold value, the system assigns a first anchor box with a center of the first anchor box to be on a left boundary of the feature cell, or on a top boundary of the feature cell, as the horizontal tile or the vertical tile, respectively. For example, the horizontal tiling is from a left edge of the feature cell, and vertical tiling is from the top edge of the feature cell. Further, the system assigns subsequent additional anchor boxes as the vertical tile, until the anchor box is out of the feature cell. Furthermore, the system moves the center of a last anchor box tiled vertically within the feature cell, when the center of the last anchor box exceeds the right side of the feature cell and within a configured allowance ratio. Additionally, the system distributes overlapped anchor boxes among the additional anchor boxes tiled vertically. Further, the system discards the last anchor box, when the center of the last anchor box exceeds the right side of the feature cell, and is out of the configured allowance ratio.

Another embodiment of the present disclosure may include a method, the method includes receiving an image of a plurality of objects. Further, the method includes determining a plurality of feature layers and a plurality of feature cell sizes corresponding to the received image, based on an aspect ratio of the received image. Additionally, the method includes determining, based on the aspect ratio of the received image, an aspect ratio of one or more anchor boxes, and determining, based on the aspect ratio of the one or more anchor boxes, a position and a number of the one or more anchor boxes to be tiled in each feature cell of the plurality of feature layers. The number of one or more anchor boxes to be tiled is based on the aspect ratio of the one or more anchor boxes and the plurality of feature cell sizes. Further, the method includes assigning the one or more anchor boxes as a horizontal tile or a vertical tile in each feature cell, when the anchor box aspect ratio is less than a first pre-defined threshold value and greater than a second pre-defined threshold value, respectively. Additionally, the method includes generating one or more feature maps using an object detection model comprising a neural network (NN) model. The one or more feature maps comprises one or more feature map tensors. Further, the method includes generating, for each layer of the one or more feature maps, a prediction tensor of a predefined dimension from the one or more feature map tensors, using a prediction convolution layer. For each layer of the one or more feature maps, the prediction convolution layer is created based on each feature cell size, the position of the one or more anchor boxes, and the aspect ratio of the one or more anchor boxes. Additionally, the method includes detecting and classifying the plurality of objects, based on the generated prediction tensor.

Yet another embodiment of the present disclosure may include a non-transitory computer-readable medium comprising machine-executable instructions that may be executable by a processor to receive an image of a plurality of objects. Further, the processor determines a plurality of feature layers and a plurality of feature cell sizes corresponding to the received image, based on an aspect ratio of the received image. Furthermore, the processor determines an aspect ratio of one or more anchor boxes from a trained model file, based on the aspect ratio of one or more anchor boxes, a position and a number of the one or more anchor boxes to be tiled in each feature cell of the plurality of feature layers. The number of one or more anchor boxes to be tiled is based on the aspect ratio of the one or more anchor boxes and the plurality of feature cell sizes. Further, the processor assigns the one or more anchor boxes as a horizontal tile or a vertical tile in each feature cell, when the anchor box aspect ratio is less than a first pre-defined threshold value and greater than a second pre-defined threshold value, respectively. Furthermore, the processor generates one or more feature maps using an object detection model comprising a neural network (NN) model. The one or more feature maps comprises one or more feature map tensors. Additionally, the processor generates, for each layer of the one or more feature maps, a prediction tensor of pre-defined dimension from the one or more feature map tensors, using a prediction convolution layer. For each layer of the one or more feature maps, the prediction convolution layer is created based on each feature cell size, the position of the one or more anchor boxes, and the aspect ratio of the one or more anchor boxes. Furthermore, the processor detects and classifies the plurality of objects, based on the generated prediction tensor.

BRIEF DESCRIPTION OF DRAWINGS

FIG. 4G illustrates an exemplary schematic diagram representation of overlapped anchor boxes for slim objects, according to an example embodiment of the present disclosure.

DETAILED DESCRIPTION

Figure 1:
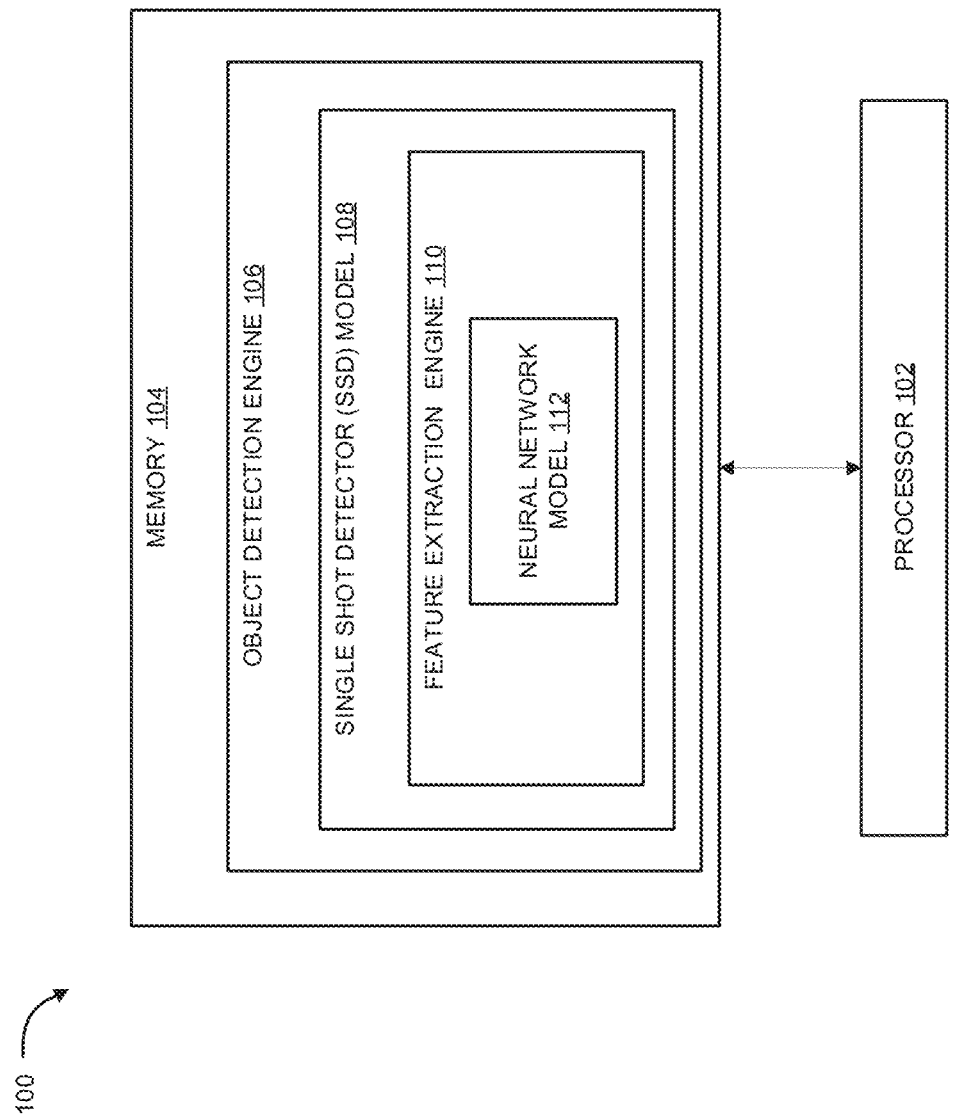
FIG. 1 illustrates an exemplary block diagram representation of a system for optimizing single shot detector (SSD) model for object detection, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one example of a particular element. The terms "a" and "an" may also denote more than one example of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Various embodiments describe systems and methods for optimizing a single shot detector (SSD) model for object detection. The system receives an image of a plurality of objects. Further, the system determines a plurality of feature layers and a plurality of feature cell sizes corresponding to the received image, based on an aspect ratio of the received image. Furthermore, the system determines an aspect ratio of one or more anchor boxes from a trained model file, based on the aspect ratio of one or more anchor boxes, a position and a number of the one or more anchor boxes to be tiled in each feature cell of the plurality of feature layers. The number of one or more anchor boxes to be tiled is based on the aspect ratio of the one or more anchor boxes and the plurality of feature cell sizes. Additionally, the system assigns the one or more anchor boxes as a horizontal tile or a vertical tile in each feature cell, when the anchor box aspect ratio is less than a first pre-defined threshold value and greater than a second pre-defined threshold value, respectively. Further, the system generates one or more feature maps using an object detection model comprising a neural network (NN) model. The one or more feature maps comprises one or more feature map tensors. Furthermore, the system generates, for each layer of the one or more feature maps, a prediction tensor of a predefined dimension from the one or more feature map tensors, using a prediction convolution layer. For each layer of the one or more feature maps, the prediction convolution layer is created based on each feature cell size, the position of the one or more anchor boxes, and the aspect ratio of the one or more anchor boxes. Additionally, the system detects and classify the plurality of objects, based on the generated prediction tensor.

Additionally, the system further annotates the received one or more images, by creating one or more bounding boxes in the one or more images, using an annotation tool. The annotation tool may be used during the training process of the system. Further, the system computes an aspect ratio the one or more bounding boxes, the plurality of feature layers, and the plurality of feature cell sizes. The one or more bounding boxes may provide a point of reference information for an object detection. The point of reference information is captured using the annotation tool. Furthermore, the system determines, for the one or more bounding boxes, a position and a size of the one or more anchor boxes, and determines, based on the aspect ratio of the one or more anchor boxes, a position and a number of the one or more anchor boxes to be tiled in each feature cell of the plurality of feature layers, based on annotations from the annotation tool. Further, the system generates one or more feature maps using the neural network (NN) model and generates the prediction tensor of the pre-defined dimension, using the prediction convolution layer. Additionally, the system creates a ground true tensor with dimension and assigns an object class and location to the ground true tensor, upon assigning the one or more anchor boxes as the vertical tile or the horizontal tile in each feature cell. Further, the system calculates a loss of classification of the object class, using the prediction tensor and the ground true tensor. Furthermore, the system transmits the calculated loss and learning rate to the prediction convolution layer and the neural network (NN) model to adjust trainable weight in the prediction convolution layer and the NN model. Further, the system exports precise checkpoint in trained data using the adjust trainable weight, to a model file.

Further, for each feature layer of the generated feature map, the system creates at least one of a depth-wise prediction convolution layer and a point-wise prediction convolution layer with an expand factor. Furthermore, the system connects at least one of the depth-wise prediction convolution layer, and the point-wise prediction convolution layer to the one or more feature map tensors. Additionally, the system obtains the prediction tensor of the pre-defined dimension for each feature layer.

Furthermore, for each anchor box of a different aspect ratio, when the anchor box aspect ratio is between the first pre-defined threshold value and the second pre-defined threshold value, the system assigns an anchor box at a center of the feature cell. Further, when the anchor box aspect ratio is less than the first pre-defined threshold value or greater than the second pre-defined threshold value, the system assigns a first anchor box with a center of the first anchor box to be on a left boundary of the feature cell, or on a top boundary of the feature cell, as the horizontal tile or the vertical tile, respectively. Further, the system assigns subsequent additional anchor boxes as the vertical tile, until the anchor box is out of the feature cell. Furthermore, the system moves the center of a last anchor box tiled vertically within the feature cell, when the center of the last anchor box exceeds the right side of the feature cell and within a configured allowance ratio. Additionally, the system distributes overlapped anchor boxes among the additional anchor boxes tiled vertically. Further, the system discards the last anchor box, when the center of last anchor box exceeds the right side of the feature cell, and is out of the configured allowance ratio.

Embodiments disclosed herein may provide a system and method to optimize a single shot detector (SSD) model for object detection. The present disclosure enables accurate object detection by modifying the standard SSD model. The present disclosure enables dynamic resizing of one or more anchor boxes for accurate object detection. The present disclosure uses for example, a Mobile Net V2 standard architecture to be used for high-quality image classification as an early feature-generating network. Further, the present disclosure uses dep-wise and pointer-wise convolution layer/tensor to reduce computational cost by providing a faster response to object detection, and requiring fewer computational resources.

FIG. 1 illustrates an exemplary block diagram representation of a system 100 for optimizing a single shot detector (SSD) model for object detection, according to an example embodiment of the present disclosure. The system 100 may be implemented by way of a single device or a combination of multiple devices that may be operatively connected or networked together. In another example, the system 100 may be implemented using a single or multiple devices/server that are networked together.

The system 100 may be a suitable combination of hardware and software. The system 100 includes a processor 102 and a memory 104. The memory 104 may include an object detection engine 106. Further, the object detection engine 106 may include a single shot detector (SSD) model 108. The single shot detector (SSD) model 108 may include a feature extraction engine 110. Further, the feature extraction engine 110 may include a base neural network (NN) model 112. The NN model 112 may be for example a Mobile Net Convolution Neural Network (CNN) model.

The system 100 may be a hardware device including the processor 102 executing machine-readable program instructions to optimize a single shot detector (SSD) model for object detection. Execution of the machine-readable program instructions by the processor 102 may enable the proposed system 100 to optimize single shot detector (SSD) model for object detection. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, feature extraction, and/or any other functions. Any reference to a task in the present disclosure may refer to an operation being or that may be performed on data.

In an example embodiment, the processor 102 may train the single shot detector (SSD) model 108 and a neural network (NN) model 112 using image dataset. In an example, the Mobile Net CNN may include but is not limited to, a Mobile Net V1, Mobile Net V2, and the like. Preferably, the Mobile Net V2, may be used to speed up object detection from the image. The Mobile Net v2 may be a convolutional neural network that may be for example, 53 layers deep. The trained Mobile Net V2 network may classify images into, for example, a plurality of object categories, such as consumer products, shelved objects, and the like.

In an example embodiment, to train the SSD model 108 and the NN model 112, the processor 102 may initially annotate one or more images received from a user, by creating one or more bounding boxes in the one or more images, using an annotation tool. The annotation tool may be used during the training process of the SSD model 108. In an example embodiment, the processor 102 may compute an aspect ratio of the one or more bounding boxes, a plurality of feature layers, and a plurality of feature cell sizes for the annotated one or more images. The one or more bounding boxes may provide a point of reference information for an object detection. The point of reference information is captured using the annotation. The point of reference information is used for training, and the point of reference information includes bounding box sizes to help to determine the anchor box sizes. In an example embodiment, the processor 102 may determine, for the one or more bounding boxes, an aspect ratio of the of the one or more anchor boxes and determine, based on the aspect ratio of the one or more anchor boxes, a position and a number of the one or more anchor boxes to be tiled in each feature cell of the plurality of feature layers, based on annotations from the annotation tool. In an example embodiment, the processor 102 may generate one or more feature maps using the neural network (NN) model 112 and generate a prediction tensor of a pre-defined dimension using a prediction convolution layer.

In an example embodiment, the processor 102 may create a ground true tensor with dimension and assign an object class and location to the ground true tensor, upon assigning the one or more anchor boxes as the vertical tile or the horizontal tile in each feature cell. The processor may create the ground true tensor 102, during the training process of the system 100. In an example embodiment, the processor 102 may calculate a loss of classification of the object class, using the prediction tensor and the ground true tensor. The dimension of the ground true tensor may be similar to the prediction tensor. In an example embodiment, the processor 102 may transmit the calculated loss and learning rate (e.g., stochastic optimization learning rate) to the prediction convolution layer and the neural network (NN) model 112 to adjust trainable weights in the prediction convolution layer and the NN model. The trainable weights may be adjusted using a standard back propagation algorithm. In an example embodiment, the processor 102 may export a precise check-point in trained data using the adjust trainable weight, to a model file. The precise check-point may include a check-point with the lowest loss. For example, the model file may be an open neural network exchange (ONNX) file, and the like. The ONXX file may be an open format for Machine Learning (ML) models, which allows to an interchange of models between various Machine Learning (ML) frameworks and tools.

In an example embodiment, the processor 102 may execute the feature extraction engine 110 to receive an image of a plurality of objects. In an example embodiment, the received image is resized, by the processor 102, to a pre-defined aspect ratio, based on a width ratio and a height ratio of the image. In an example embodiment, the one or more objects correspond to, but are not limited to, slim objects, flat objects, and the like. For example, the object may include, but are not limited to, bottles, tins, packs, sachets, sheets, and the like.

In an example embodiment, the processor 102 may execute the feature extraction engine 110 to determine a plurality of feature layers and a plurality of feature cell sizes corresponding to the received image, based on an aspect ratio of the received image.

In an example embodiment, the processor 102 may execute the feature extraction engine 110 to determine an aspect ratio of one or more anchor boxes from a trained model file, based on the aspect ratio of one or more anchor boxes, a position and a number of the one or more anchor boxes to be tiled in each feature cell of the plurality of feature layers. In an example embodiment, the number of one or more anchor boxes to be tiled is based on the aspect ratio of the one or more anchor boxes and the plurality of feature cell sizes. For example, during training of the feature extraction engine 110, the feature extraction engine 110 may determine, based on the annotation bounding box sizes, an aspect ratio of one or more anchor boxes. Further, for an object detection, the feature extraction engine 110 may determine, based on a model file saved during the training process of the feature extraction engine 110, an aspect ratio of one or more anchor boxes. The annotated bounding box sizes may be received from the annotation tool, during the training process of the SSD model 108.

In an example embodiment, the processor 102 may execute the feature extraction engine 110 to assign the one or more anchor boxes as a horizontal tile or a vertical tile in each feature cell, when the anchor box aspect ratio is less than a first pre-defined threshold value and greater than a second pre-defined threshold value, respectively. In an example embodiment, the assigned one or more anchor boxes (represented as the horizontal tile or the vertical tile) in each feature cell may be of the same size. In an example embodiment, the processor 102 may further apply a non-maximum suppression (NMS) technique to suppress poorly detected one or more bounding boxes. For example, the NMS technique may be used during object detection and may not be used during the training process of the feature extraction engine 110.

In an example embodiment, the processor 102 may execute the feature extraction engine 110 to generate one or more feature maps using an object detection model, such as the single shot detector (SSD) model 108, comprising a neural network (NN) model 112. In an example embodiment, the one or more feature maps includes one or more feature map tensors.

In an example embodiment, the processor 102 may execute the feature extraction engine 110 to generate, for each layer of the one or more feature maps, a prediction tensor of a predefined dimension from the one or more feature map tensors, using a prediction a convolution layer. For each layer of the one or more feature maps, the prediction convolution layer is created based on each feature cell size, the position of the one or more anchor boxes, and the aspect ratio of the one or more anchor boxes. For example, the prediction tensor of 2 images may be as shown below:

```
Dimension of the prediction tensor:
(num_of_photos, num_of_anchorbox_in_all_feature_cells, num_of_object_class
 +1 + 4)
data sample: center(x), center(y), width, height is the location of object
    [[//photo 1
        probability of object class
            0(background)
            obj 1
            obj 2
            obj 3
            obj 4
            center(x)
            center(y)
            width
            height
    [ 0.0 0.2 0.7 0.1 0.0, 0, 0, 0, 0] //anchor_box 1 in cell 1
    [ 0.9 0.0 0.0 0.1 0.0, 0, 0, 0, 0] //anchor_box 2 in cell 1
    [ 0.0 0.0 0.0 1.0 0.0, 0, 0, 0, 0] //anchor_box 3 in cell 1
    [ 0.0 0.2 0.7 0.1 0.0, 0, 0, 0, 0] //anchor_box 1 in cell 2
    [ 0.9 0.0 0.0 0.1 0.0, 0, 0, 0, 0] //anchor_box 2 in cell 2
    [ 0.0 0.0 0.0 1.0 0.0, 0, 0, 0, 0] //anchor_box 3 in cell 2
        ...
    ],
    [//photo 2
    [ 0.0 0.2 0.7 0.1 0.0, 0,0,0,0]
    [ 0.9 0.0 0.0 0.1 0.0, 0,0,0,0]
    [ 0.0 0.0 0.0 1.0 0.0, 0,0,0,0]
    ]]
```

In an example embodiment, the processor 102 may execute the feature extraction engine 110 to detect and classify the plurality of objects, based on the generated prediction tensor. In an example embodiment, the prediction tensor includes, but is not limited to, values corresponding to the dimensions of the image, and the value is determined using the one or more anchor boxes.

In an example embodiment, for each feature layer of the generated feature map, the feature extraction engine 110 may create at least one of a depth-wise prediction convolution layer and a point-wise prediction convolution layer with an expand factor. Further, the feature extraction engine 110 may connect at least one of the depth-wise prediction convolution layer, and the point-wise prediction convolution layer to the one or more feature map tensor. Furthermore, the feature extraction engine 110 may obtain the prediction tensor of the pre-defined dimension for each feature layer.

In an example embodiment, for each anchor box of a different aspect ratio, when the anchor box aspect ratio is between the first pre-defined threshold value and the second pre-defined threshold value, the processor 102 may assign an anchor box at a center of the feature cell. In an example embodiment, when the anchor box aspect ratio is less than the first pre-defined threshold value or greater than the second pre-defined threshold value, the processor 102 may assign a first anchor box with a center of the first anchor box to be on a left boundary of the feature cell, or on a top boundary of the feature cell, as the horizontal tile or the vertical tile, respectively. For example, the horizontal tiling is from a left edge of the feature cell, and vertical tiling is from the top edge of the feature cell. Further, the processor 102 may assign subsequent additional anchor boxes as the vertical tile, until the anchor box is out of the feature cell. Furthermore, the processor 102 may move the center of a last anchor tiled vertically box within the feature cell, when the center of the last anchor box exceeds the right side of the feature cell and within a configured allowance ratio. Additionally, the processor 102 may distribute overlapped anchor boxes among the additional anchor boxes tiled vertically. Further, the processor 102 may discard the last anchor box, when the center of the last anchor box exceeds the right side of the feature cell, and is out of the configured allowance ratio.

Figure 2:
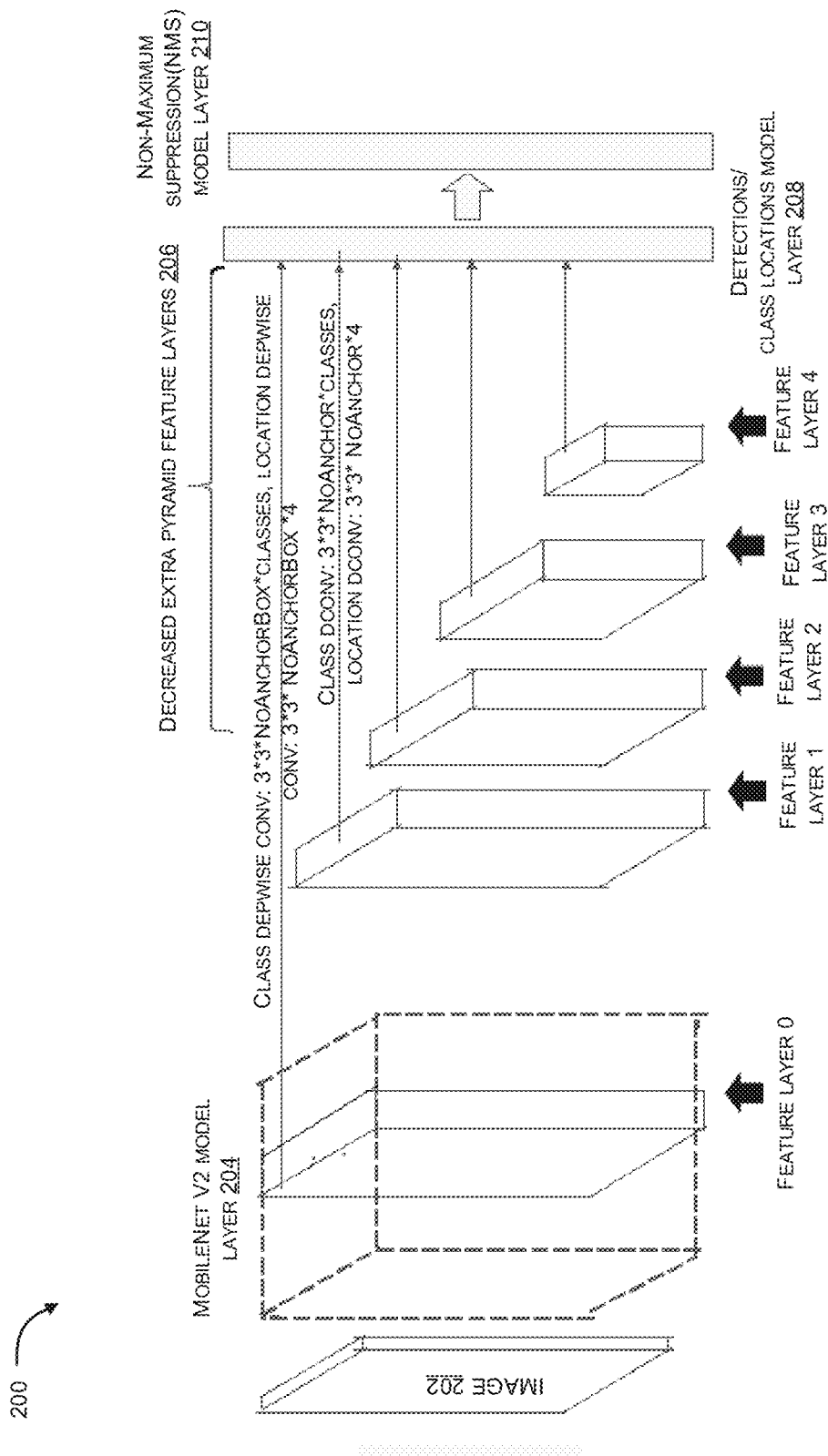
FIG. 2 illustrates an exemplary block diagram representation of an optimized single shot detector (SSD) network architecture for object detection in real-time, according to an example embodiment of the present disclosure.

FIG. 2 illustrates an exemplary block diagram representation of an optimized single shot detector (SSD) network architecture 200 for object detection in real time, according to an example embodiment of the present disclosure.

The SSD approach may be based on a feed-forward convolutional network that produces a fixed-size collection of bounding boxes and scores for the presence of object class instances in those boxes, followed by a non-maximum suppression (NMS) step using the NMS model layer 210 to produce the final detections in real-time. The NMS may be used for real-time object detection, however, the NMS may not be used during training process of the optimized single shot detector (SSD) network architecture 200. In an example embodiment, the early network layers such as a "feature layer 0" may be a Mobile Net V2 CNN model layer 204, which is used for high-quality image classification of an image 202, as an early feature generating network.

Further, in multi-scale feature maps for object detection, the SSD network architecture 200 may include convolutional feature layers 206 to the end of a truncated network (i.e., extra pyramid feature layers 206 shown in FIG. 2). These layers decrease in size progressively and allow predictions of detections at multiple scales. The convolutional model for predicting detections is different for each feature layer that operates on a single-scale feature map.

Each feature layer can produce a fixed set of detection predictions using a set of convolutional filters. These are indicated on top of the SSD network architecture 200 in FIG. 2. For a feature layer of size 'm×n' with 'p' channels, the basic element for predicting parameters of a potential detection is a '3×3×p' small kernel that produces either a score for a category or a shape offset relative to the anchor box coordinates. At each of the 'm×n' locations where the kernel is applied, it produces an output value. The bounding box offset output values are measured relative to an anchor box position relative to each feature map location.

The SSD network architecture 200 may include a set of anchor boxes with each feature map cell, for multiple feature maps at the top of the network. The anchor boxes may tile the feature map in a convolutional manner so that the position of each box relative to its corresponding cell is fixed. At each feature map cell, the SSD network architecture 200 may predict the offsets relative to the anchor box shapes in the cell, as well as the per-class scores that indicate the presence of a class instance in each of those boxes. Specifically, for each box, the SSD network architecture 200 may create a prediction convolution filter based on a number of anchor boxes per feature map cell and a maximum object class number. The maximum object class number may typical be, for example, 20-30 SKU. Where more objects may be split into different models, as the training and detection time may become unacceptable.

For example, the resolution of an input image shown in FIG. 2 may be, for example, 600×800 in size. The SSD network architecture 200 may use for example, '5' feature layers to predict object class and location using a detections/class locations model layer 208. The NMS technique or the NMS model layer 210 may be used by the detections/class locations model layer 208. The SSD network architecture 200 may choose depth-wise convolution layer/tensor and pointer-wise convolution layer/tensor to reduce computational cost. For example, one of the kernel/convolution layer may include a kernel of classification, which is used to generate probability of each object class.

```
                    dimension: (3*5, 3, 3),
  here the number of anchor_box in one cell is 3, 5=(number_object_class +1),
                    same as prediction tensor above
                  (3,3) is standard common kernel size
                              data:
                                [
                          //15 channels
                     //below is the one of 3x3 kernel
                            [[ 0, 3, 4.8]
                            [ 0, 5.1, 9.2]
                            [-2.6, 3, 3.8]]
                     //will have another 14 3x3 kernels
                              ...
                              ]
                         kernel of location
dimension: (3*4, 3, 3), here the number of anchor_box in one cell is 3, 4 is cx, cy,
                              w, h
                                [
                          //12 channels
                     //below is the one of 3x3 kernel
                            [[ 1, 3, 4.8]
                            [ 0, 6.1, 9.2]
                            [-2.6, 3, 3.8]]
                     //will have another 11 3x3 kernels
                              ...
                              ]
```

Figure 3A:
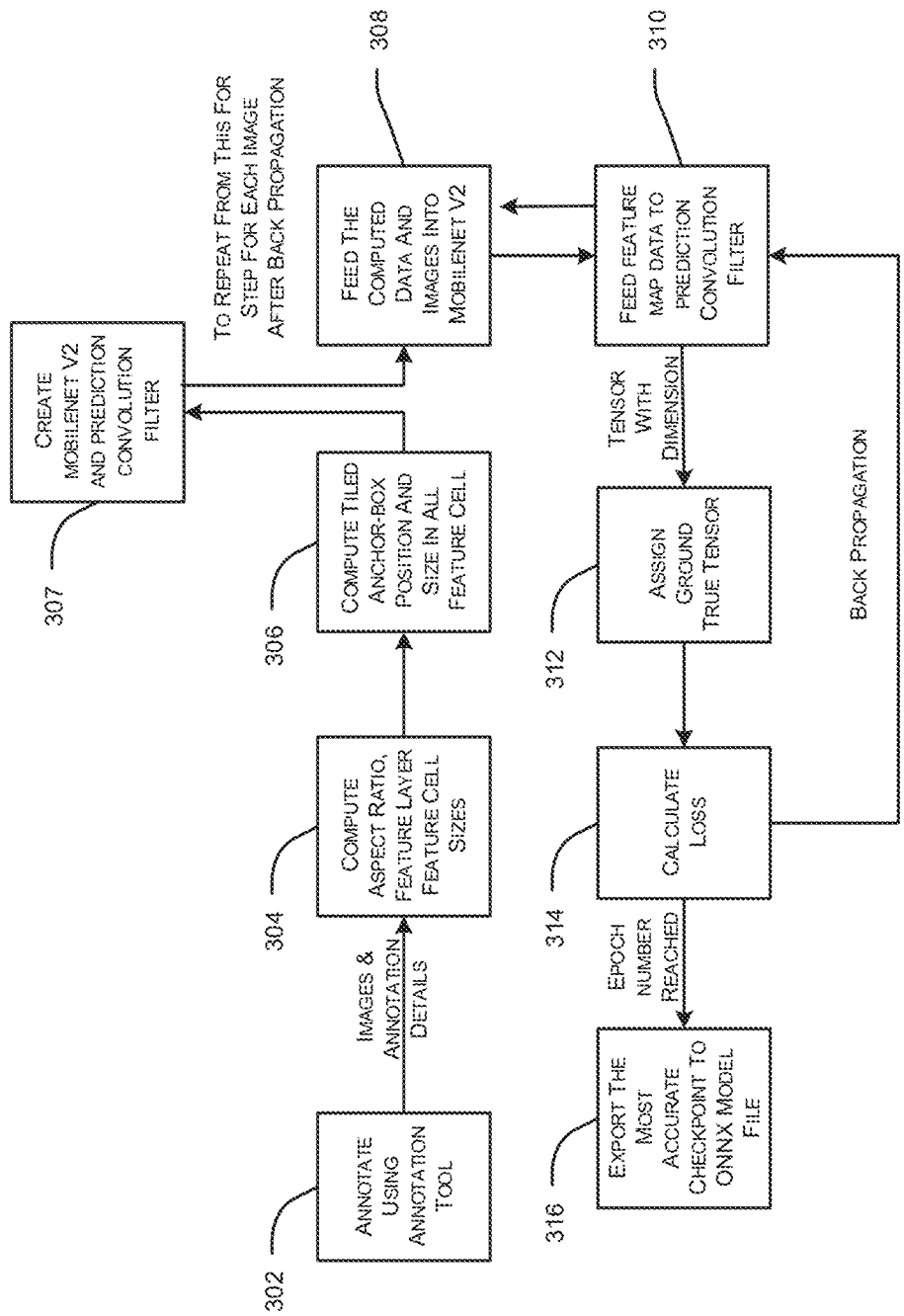
FIG. 3A illustrates an exemplary flow diagram representation of a training method for an SSD model, according to an example embodiment of the present disclosure.

The SSD network architecture 200 may be trained for detecting the objects in the input image. FIG. 3A illustrates an exemplary flow diagram representation training an SSD model, according to an example embodiment of the present disclosure.

At step 302, the training method includes annotating, by the processor 102, the input image using an annotation tool. At step 304, the training method includes computing, by the processor 102, an aspect ratio of anchor box. Further, the processor 102 may calculate the aspect ratio of the bounding boxes created by the annotation tool.

The processor 102 may use a k-means clustering algorithm to group the aspect ratio into 5 aspect ratios, A {0, 1, 2, 3, 4}. The processor 102 may choose for example, a 5-aspect ratio group after intensive testing to balance the accuracy and processing cost.

Further, the processor 102 may compute feature layer width and height for different feature layers. Additionally, the processor 102 may compute feature cell width and height for each feature layer. For example, based on input image resolution 600×800, the formula for a featured layer calculation of width and height is shown in equation 1 below:

$$\text{For each feature layer } L \text{ in } [0, 4] \quad \text{Equation 1}$$
$$\text{flayer\_w}[L] = Ceil((600/16)/2L),$$
$$\text{flayer\_h}[L] = Ceil((800/16)/2L)$$

The flayer_w, flayer_h may be, for example, {{38,50}, {19.25}, {10.13}, {5,7}, {3,4}}

Further, a formula for featured cell calculation to compute the feature cell width/height may be shown in equation 2 below:

$$\text{For each feature layer } L \text{ in } [0, 4] \quad \text{Equation 2}$$
$$\text{fcell\_size\_w}[L] = 1/(\text{flayer\_w}[L]),$$
$$\text{fcell\_size\_h}[L] = 1/(\text{flayer\_h}[L])$$

Further, the formula (for a padded feature cell) may be modified as shown in equation 3, to avoid pixel offset which may impact the results for closely packed SKU too:

$$\text{For each feature layer } L \text{ in } [0, 4] \quad \text{Equation 3}$$
$$\text{fcell\_size\_w}[L] = 1/(600/(16*2L)),$$
$$\text{fcell\_size\_h}[L] = 1/(800/(16*2L))$$

For example, {fcell_size_w, fcell_size_h} may be {1/38, 1/50}, {1/19,1/25}, {1/9.5, 1/12.5}, {1/4.75, 1/6.25}, {1/2.375,1/3.125}. Also, the sum of the feature cell sizes may be greater than 1 (the whole picture size) due to padded feature cell and may not be rounded to avoid pixel offset which will lower the accuracy.

At step 306, the training method includes, laying out, by the processor 102, tiled anchor box in all feature cells. This may be a key factor to improve the accuracy of object detection.

Figure 4A:
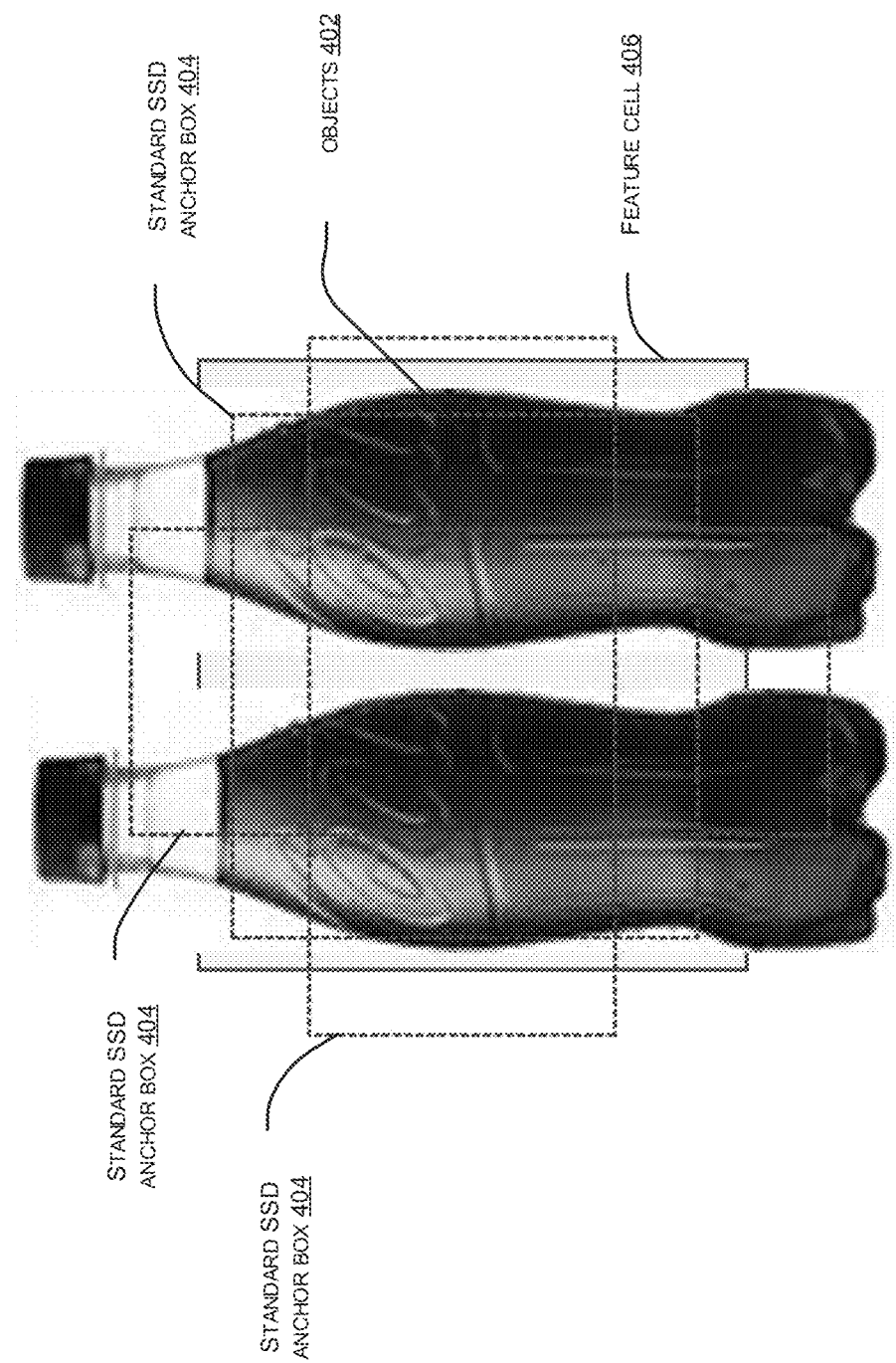
FIG. 4A illustrates an exemplary schematic diagram representation of anchor boxes with different aspect ratio used in standard SSD model, according to an example embodiment of the present disclosure.

For example, the standard SSD model, for tightly packed items shown in FIG. 4A, may only detect 1 of 2 objects 402. Because only one of the standard SSD anchor-box size 404 (aspect ratio) may accurately match the objects 402 in a feature cell 406. One of the other anchor boxes may match the other object 402, and may not accurately detect the objects. The standard SSD model may use anchor box 404 with a different aspect ratio, only showing 3 anchor boxes as an example in FIG. 4A.

Figure 4B:
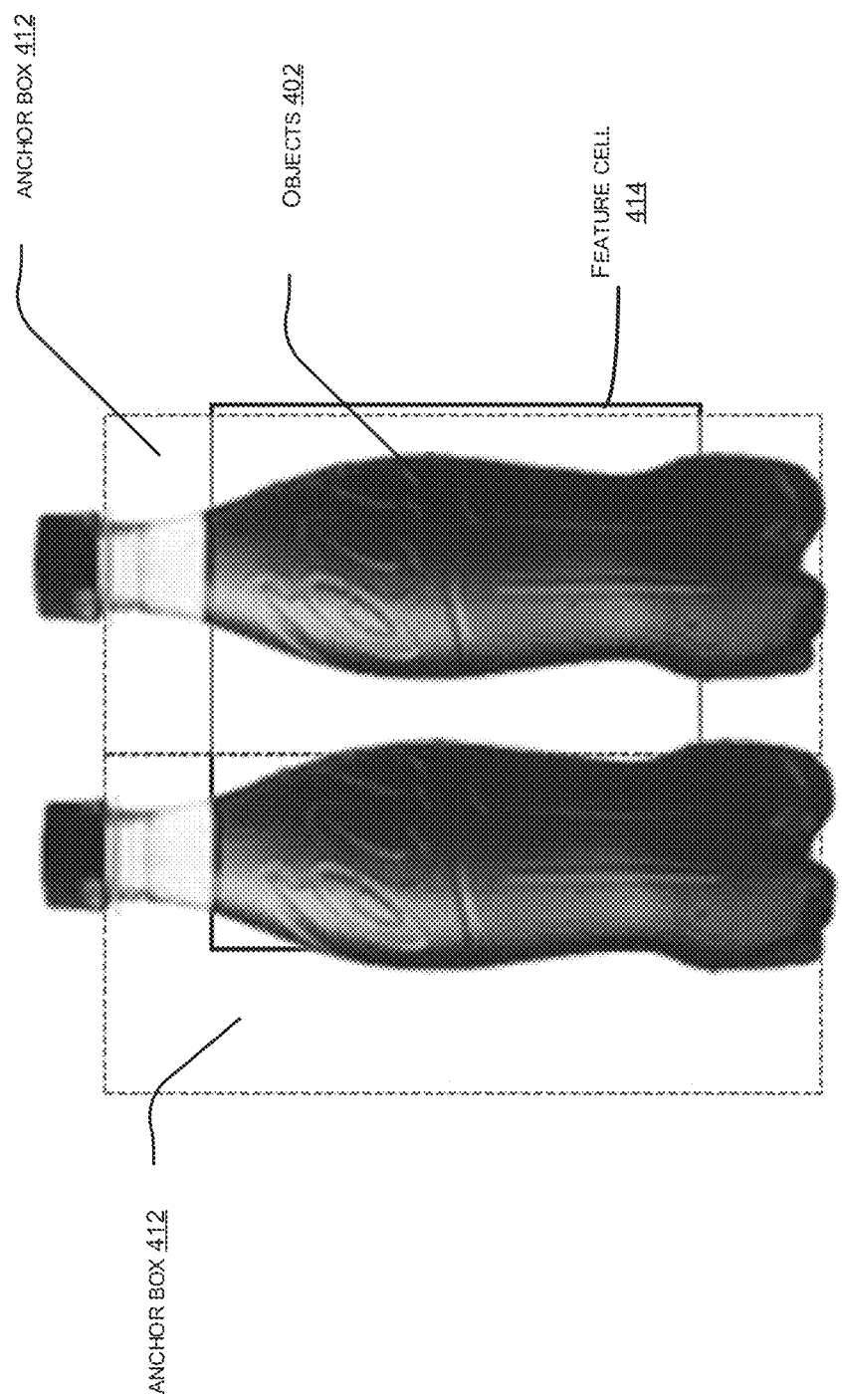
FIG. 4B illustrates an exemplary schematic diagram representation of equal size horizontal anchor boxes using the proposed SSD network architecture, according to an example embodiment of the present disclosure.

The proposed SSD network architecture 200 may assign/tile, for example, two anchor boxes horizontally for better detection of slim objects as shown in FIG. 4B. In an example, a layout of anchor box 412 may be performed using one or more rules. If an aspect ratio of the anchor box 412 is between a predefined range, say [0.6, 1/0.6], the processor 102 may place one anchor box at the center of a feature cell 414. The first value is the threshold for horizontal tiling (slim and tall items) and the second value is the threshold for vertical tiling (flat items). In an example embodiment, the horizontal tiling threshold should be more than 0.5 (half the size) and 0.6 may be selected to ensure that the remaining area of the feature cell 414 may not be larger, and an overlap of the anchor boxes may not be more as these may result in a low recall rate (detection result). Further, a vertical tiling threshold may usually be a 1/horizontal tiling threshold.

Further, if the aspect ratio is less than 0.6, the processor 102 may tile anchor boxes horizontally. The processor 102 may place the first anchor-box in the feature cell 414. The center of the first anchor box lies on a left boundary of the feature cell 414. Further, the processor 102 tiles additional anchor boxes, until the additional anchor boxes are just out of the feature cell 414. For example, if the center of a last anchor box exceeds the right side/right boundary of the feature cell 414, but within a configured allowance ratio, then the processor 102 may move the center of a last anchor box within the feature cell 414 to distribute an overlap among the anchor boxes. If the center of last anchor box exceeds the right side of the feature cell 414, and is out of the configured allowance ratio, the processor 102 may discard the last anchor box. For example, the configured allowance ratio may be defined as a ratio of anchor box size, which may be a value in range, for example, (0.0,0.5). If the configured allowance ratio is greater than 0.5, the processor 102 may fit another anchor box, based on the layout rule mentioned above. Usually selected value may be, for example, 0.4 to avoid excessive overlap of the anchor boxes, to avoid a low recall rate (i.e., object detection result).

Furthermore, if the aspect ratio is greater than 1/0.6, the rules applied to tile anchor boxes for the horizontal tiling may be used, but in a vertical direction. The horizontal tiling of the anchor boxes may be illustrated in FIG. 4C.

Example Scenario 1: Ideal Layout of Anchor Boxes

Figure 4C:
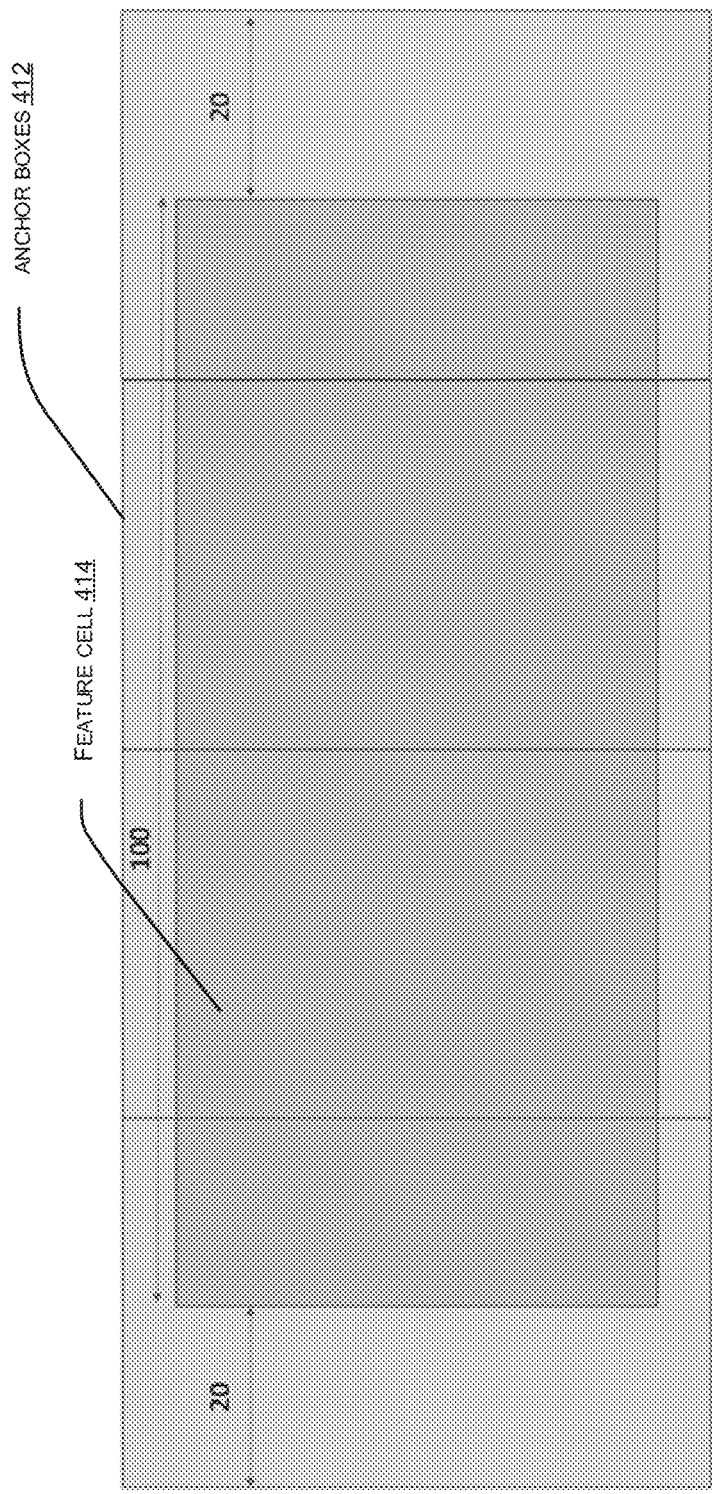
FIG. 4C illustrates an exemplary schematic diagram representation of an ideal layout of 3 anchor boxes, according to an example embodiment of the present disclosure.

For example, 3 anchor boxes can fit appropriately within the feature cell 414, a width of 100, as shown in FIG. 4C. The width of the anchor box 412 may be for example, 40, and the overlap allowance ratio may be 0.4.

Example Scenario 2

Figure 4D:
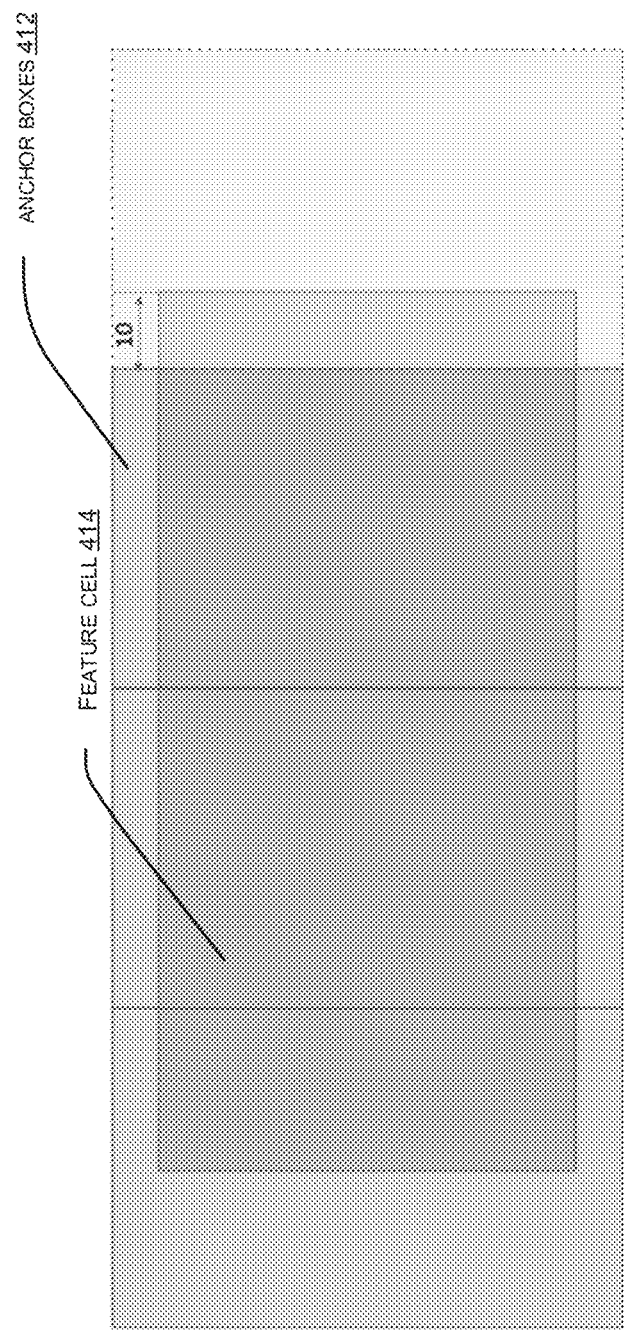
FIG. 4D illustrates an exemplary schematic diagram representation of anchor boxes with a remaining area in a feature cell that is not covered and a remaining area is less than the allowance ratio, according to an example embodiment of the present disclosure.

For example, in the width of the feature cell 414, if 3 anchor boxes cannot fit, then there, may be an area in the feature cell 414 which is not covered using the 3 anchor boxes, e.g., '10' as shown in FIG. 4D. Since, the margin ratio of the remaining area is less than the allowance ratio, hence the processor 102 may not add a 4th anchor box. In this case the last anchor box may be discarded as the margin ratio (10/40=0.25) is less than the allowance ratio.

Example Scenario 3

Figure 4E:
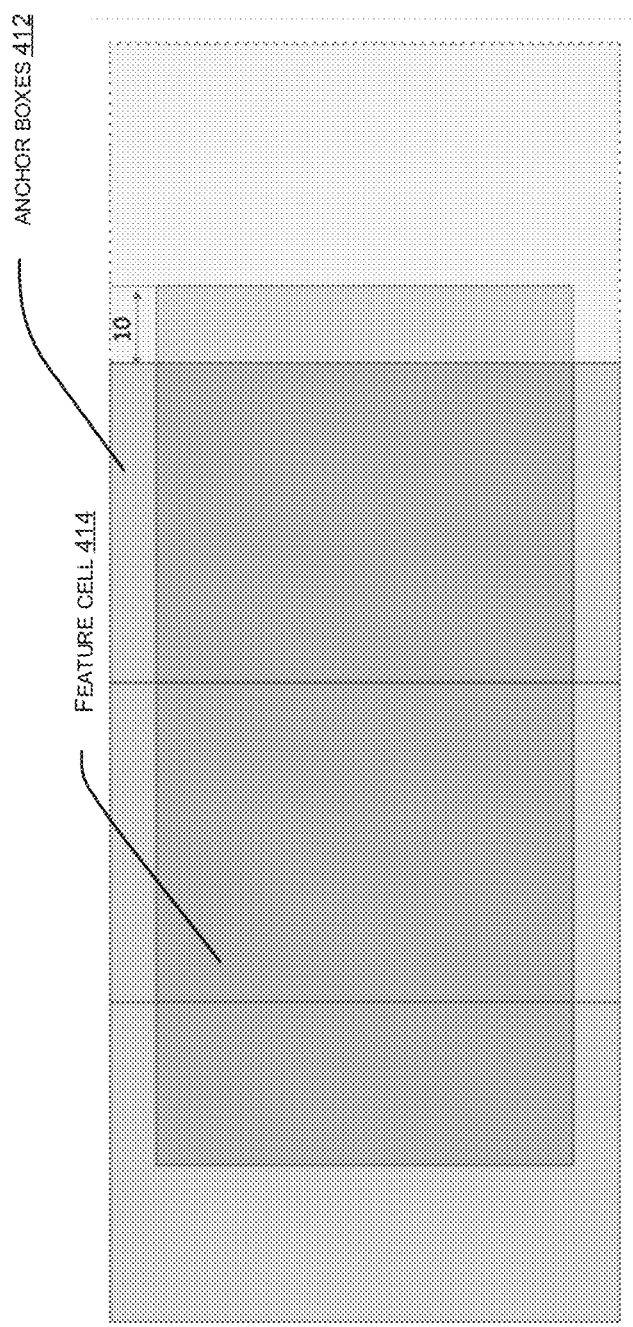
FIG. 4E illustrates an exemplary schematic diagram representation of anchor boxes with a remaining area in a feature cell that is not covered and a remaining area is greater than or equal to the allowance ratio, according to an example embodiment of the present disclosure.
Figure 4F:
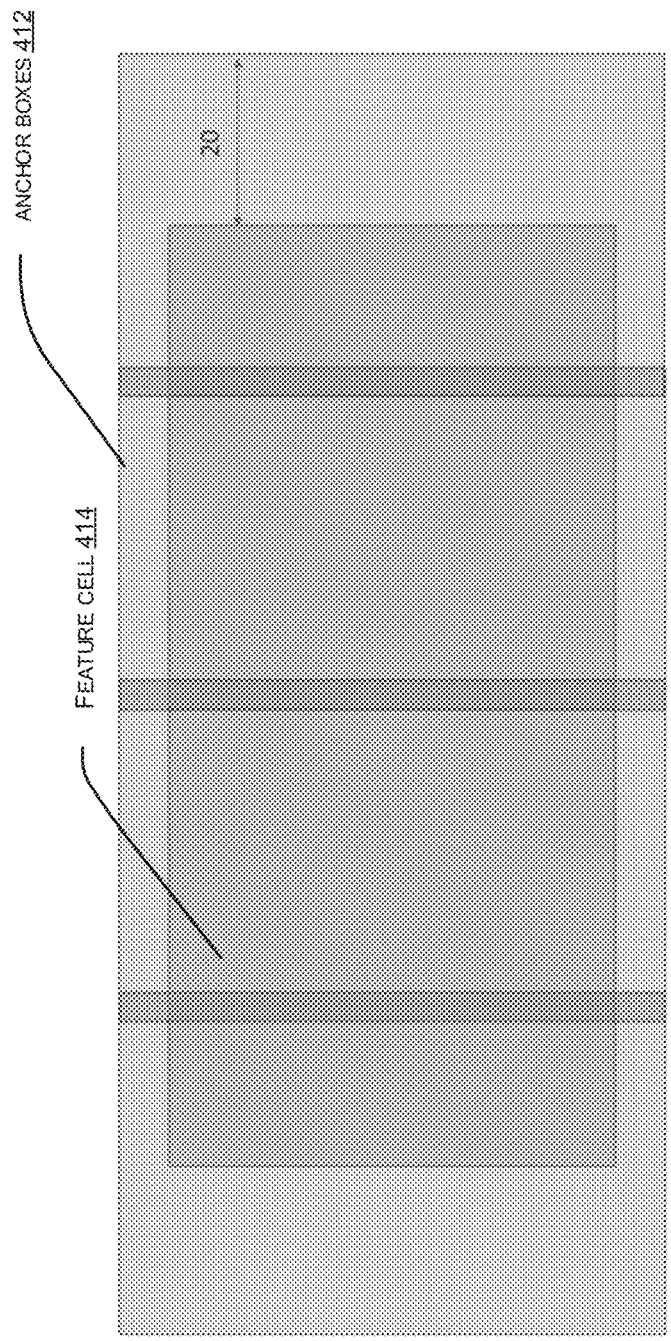
FIG. 4F illustrates an exemplary schematic diagram representation of the overlapped anchor boxes, according to an example embodiment of the present disclosure.

For example, in the feature cell 414, if 3 anchor boxes cannot fit, then, there may be an area in the feature cell 414 which is not covered using 3 anchor boxes, e.g., '10' as shown in FIG. 4E. In this example, the margin ratio of the remaining area of the feature cell 414 may be greater than or equal to the allowance ratio. The processor 102 may add a 4th anchor box and adjust subsequent anchor boxes in a such a manner to overlap evenly previous anchor boxes. In this case, the last anchor box may be adjusted for the overlap of the additional anchor boxes, as the margin ratio (10/40=0.25) is larger than or equal to the allowance ratio. The overlapped tiled anchor boxes are shown in FIG. 4F.

The logic used to calculate the positions of the anchor boxes, in an example embodiment, is described below:

```
Anchor boxes = empty
For each feature layer L in (0, 4)
    For each row in feature layer L, //row∈ [0, flayer_h[L]]
        For each column in feature layer L, // column ∈ [0, flayer_w[L]]
            fcell_location_center = {x: fcell_size_w[L]* (column + 0.5),
                                     y: fcell_size_h[L]* (row+0.5)}
            anchorbox. center= fcell_location_center
            anchorbox. width = fcell_size_w[L]*sqrt (2)
            anchorbox. height = fcell_size_h[L]*sqrt (2)
            add anchor box to Anchor boxes
            for every aspect ratio 'ar' in A (0,1,2,3,4} //computed in step 1
                        anchor_w= fcell_size_w[L]* sqrt(ar)
                        anchor_h= fcell_size_h[L]/ sqrt(ar)
                        //0.6, 1/0.6 are not hardcoded value, they are specified at
                                train time
                            //after training, the figures 0.6 and 1/0.6 are saved into
                                model file
                        if ar ∈ [0.6, 1/0.6]
                            anchorbox. center= fcell_location_center
                            anchorbox. width = anchor_w
                            anchorbox. height = anchor_h
                            add anchor box to Anchor boxes
                        else if ar < 0.6. //tile anchor box horizontally,
                            num = (fcell_size_w[L] + anchor_w/2) / anchor_w
                            frac= frac_of(num) //get fractional part of num
                                num_integer=floor(num) //get integer part of num
                                    overlap = 0.0
                        if frac ∈ [0.4, 0.5] // [0.4, 05] is the allowance
                                overlap = (0.5 – frac) / num_integer
                                x= fcell_size_w[L]* column
                                y=fcell_location_center.y
                                    while x < fcell_size_w[L]* (column + 1)
                                    anchorbox. center= {x, y}
                                    anchorbox. width = anchor_w
                                    anchorbox. height = anchor_h
                                    add anchor box to Anchor boxes
                                    x += anchor_w-overlap
                        else if ar > 1.0/0.6. //tile anchor box vertically
                            num = (fcell_size_h[L] + anchor_h/2) / anchor_h
                            frac = frac_of(num) //get fractional part of num
                                num_integer = floor(num) //get integer part of num
                                    overlap = 0.0
            if frac ∈ [0.4, 0.5] // [0.4, 05] is the allowance
                    overlap = (0.5 – frac) / num_integer
                        x= fcell_location_center.x
                        y= fcell_size_h[L]* row
                            while y < fcell_size_h[L]* (row + 1)
                            anchorbox. center= {x, y}
                            anchor box. width = anchor_w
                            anchor box. height = anchor_h
                            add anchor box to Anchor boxes
                            y += anchor_h – overlap
```

Referring to FIG. 3A, at step 307, the method includes, creating Mobile Net V2 model and a prediction convolution filter/layer.

at step 308, the method includes providing, by the processor 102, the NN model 112 (such as Mobile Net V2, herein after referred to as Mobile Net V2 model 112) with image data to generate all feature map layers.

At step 310, similar to standard SSD, the method includes feeding, by the processor 102, the feature map data to one or more prediction convolution layer/filter based on the number of anchor boxes per feature map cell and max class number (number of object type). The prediction convolution layer may generate a prediction tensor of a dimension such as a [feature_height, feature_width, number_of_anchor_per_cell, (class+1)+4]. The dimension of convolution layer may be [3, 3, number_of_anchor_per_cell, (class+1)+4]. Here, the processor 102 may use the combination of depth-wise and point-wise convolutions to reduce computational cost.

For each layer of the generated feature map, the processor 102 may create depth-wise/point-wise convolution layer/tensor with expand factor 6. The depth-wise/point-wise convolution layer/tensor may be similar to a normal 3×3 kernel convolution layer/tensor. Further, the processor 102 may connect such a convolution layer to feature map tensor. Furthermore, the processor 102 may obtain prediction result tensor (i.e., prediction tensor) of a pre-defined dimension [feature_height, feature_width, number_of_anchor_per_cell, (class+1)+4)].

At step 312, the method includes assigning, by the processor 102, a ground true tensor. Based on a location of anchor boxes, the processor 102 may create a ground true tensor with dimension [number_of_all_anchorbox, ((class+1)+4)], and assign object identity (ID) (class) and location to that ground true tensor.

At step 314, the method includes computing, by the processor 102, a loss. The processor 102 may obtain predication tensor with dimension [feature_height, feature_width, number_of_anchor_per_cell, (class+1)+4], and the ground true tensor(g). The processor 102 may use a focal loss to compute the loss of classification. Same as standard SSD, the processor 102 uses "smooth_L1 loss" to compute location loss. The smooth L1 loss may be used for a bounding box regression (i.e., refine or predict localization boxes) for the object detection. Further, the processor 102 may perform backpropagation by the computed loss and learning rate to adjust those trainable weights in the network.

At step 316, the method includes increasing, by the processor 102, an epoch number. If the maximum epoch reaches, the count may end, else the processor 102 may read another input image and annotation bounding boxes. For example, to avoid longer training time of a model, the epoch number may be a value of 300.

Figure 3B:
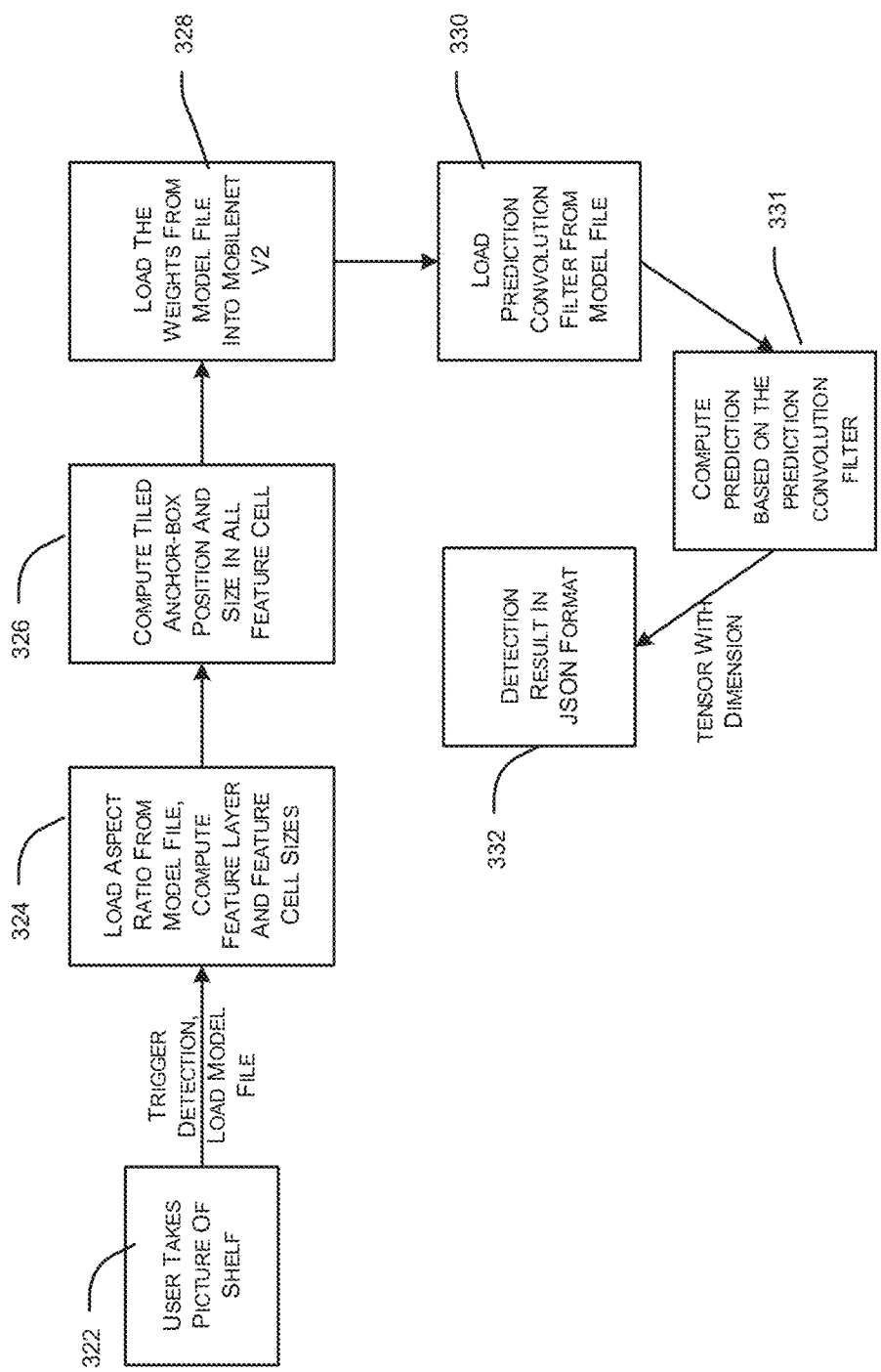
FIG. 3B illustrates an exemplary flow diagram representation of object detection method using a mobile device, according to an example embodiment of the present disclosure.

Referring to FIG. 3B, FIG. 3B illustrates an exemplary flow diagram representation of the object detection method using a mobile device, according to an example embodiment of the present disclosure.

At step 322, the method includes receiving, by the processor 102, an input image from a user via a mobile device (not shown in FIGs.).

At step 324, the method includes retrieving, by the processor 102, an anchor box specification data from a model file stored during training of the SSD network architecture 200, and computing feature layers and feature cell sizes corresponding to the image.

At step 326, the method includes assigning/laying out, by the processor 102, one or more anchor boxes 412 for the image.

At step 328, the method includes loading, by the processor 102, weights from the model file into the Mobile Net V2 model 112.

At step 330, the method includes creating, by the processor 102, an inference network such as a prediction convolution layer, based on the model file. The processor 102 may provide the resized image to the prediction convolution layer to get the output tensor (i.e., prediction tensor).

At step 331, the method includes computing, by the processor 102, prediction based on the prediction convolution filter/layer.

At step 332, the method includes providing, by the processor 102, an object detection result in a for example, JavaScript object notation (JSON) format.

For example, in case the objects are extremely slim as shown in FIG. 4G, the processor 102 may assign/tile three 1/2.5 anchor boxes 412 in the feature cell 414, with some overlap to improve the accuracy of the object detection.

Figure 5:
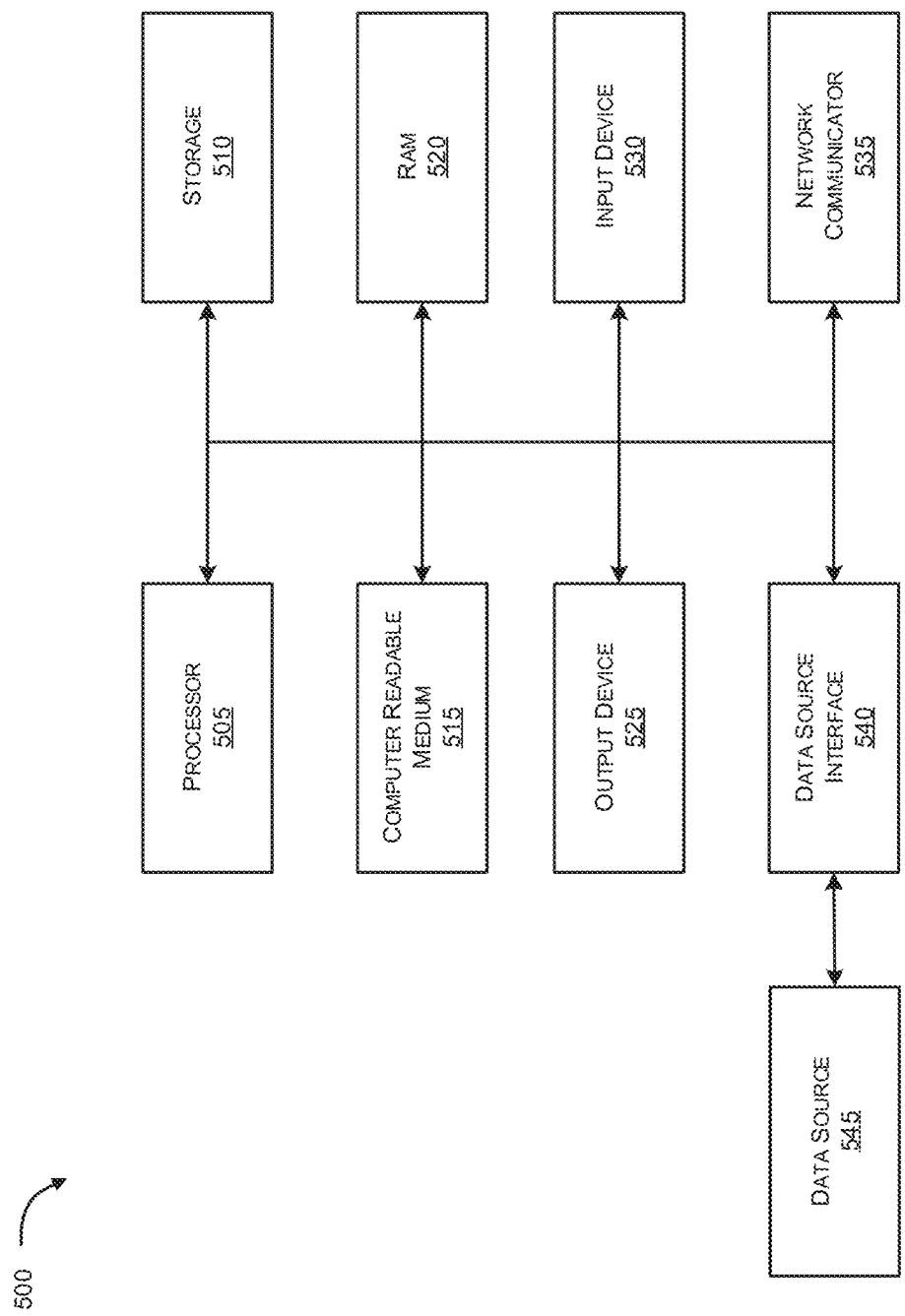
FIG. 5 illustrates a hardware platform for an implementation of the disclosed system, according to an example embodiment of the present disclosure.

FIG. 5 illustrates a hardware platform 500 for implementation of the disclosed system 100, according to an example embodiment of the present disclosure. For the sake of brevity, the construction, and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 500. As illustrated, the hardware platform 500 may include additional components not shown, and some of the components described may be removed and/or modified. For example, a computer system with multiple GPUs may be located on external-cloud platforms including Amazon Web Services, or internal corporate cloud computing clusters, or organizational computing resources.

The hardware platform 500 may be a computer system such as the system 100 that may be used with the embodiments described herein. The computer system may represent a computational platform that includes components that may be in a server or another computer system. The computer system may execute, by the processor 505 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather data and documents and analyze documents. In an example, the work and data orchestration engine 110, and the visualization engine 110, may be software codes or components performing these steps.

The instructions on the computer-readable storage medium 510 are read and stored the instructions in storage 515 or in random access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 520 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interact with the computer system. The input device 530 may include, for example, a keyboard, a keypad, a mouse, or a touchscreen. Each of these output devices 525 and input device 530 may be joined by one or more additional peripherals. For example, the output device 525 may be used to display the results such as bot responses by the executable chatbot.

A network communicator 535 may be provided to connect the computer system to a network and in turn to other devices connected to the network including other clients, servers, data stores, and interfaces, for example. A network communicator 535 may include, for example, a network adapter such as a LAN adapter or a wireless adapter. The computer system may include a data sources interface 540 to access the data source 545. The data source 545 may be an information resource. As an example, a database of exceptions and rules may be provided as the data source 545. Moreover, knowledge repositories and curated data may be other examples of the data source 545.

Figure 6:
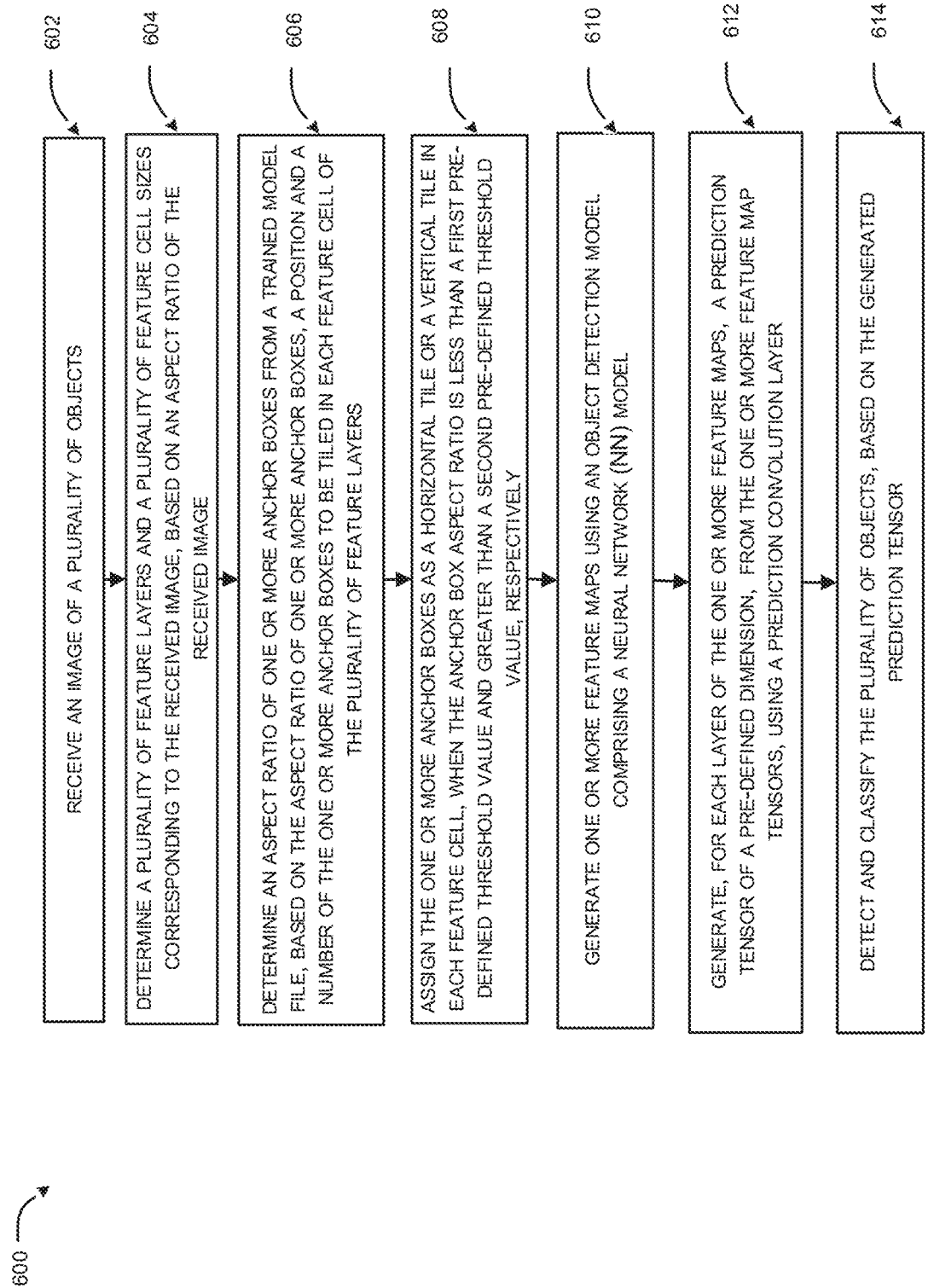
FIG. 6 illustrates a flow chart depicting a method of optimizing single shot detector (SSD) model for object detection, according to an example embodiment of the present disclosure.

FIG. 6 illustrates a flow chart depicting a method of optimizing single shot detector (SSD) model for object detection, according to an example embodiment of the present disclosure.

At block 602, the method 600 may include receiving, by a processor associated with a system, an image of a plurality of objects.

At block 604, the method 600 may include determining, by the processor, a plurality of feature layers and a plurality of feature cell sizes corresponding to the received image, based on an aspect ratio of the received image.

At block 606, the method 600 may include determining, by the processor, an aspect ratio of one or more anchor boxes from a trained model file, based on the aspect ratio of one or more anchor boxes, a position and a number of the one or more anchor boxes to be tiled in each feature cell of the plurality of feature layers. The number of one or more anchor boxes to be tiled is based on the aspect ratio of the one or more anchor boxes and the plurality of feature cell sizes.

At block 608, the method 600 may include assigning, by the processor 102, the one or more anchor boxes as a horizontal tile or a vertical tile in each feature cell, when the anchor box aspect ratio is less than a first pre-defined threshold value and greater than a second pre-defined threshold value, respectively.

At block 610, the method 600 may include generating, by the processor, one or more feature maps using an object detection model comprising a neural network (NN) model. The one or more feature maps includes one or more feature map tensors.

At block 612, the method 600 may include generating, by the processor, for each layer of the one or more feature maps, a prediction tensor of a pre-defined dimension from the one or more feature map tensors, using a prediction convolution layer. For each layer of the one or more feature maps, the prediction convolution layer is created based each feature cell size, the position of the one or more anchor boxes, and the aspect ratio of the one or more anchor boxes.

At block 614, the method 600 may include detecting, by the processor, and classifying the plurality of objects, based on the generated prediction tensor.

The order in which the method 600 is described is not intended to be construed as a limitation, and any number of the described method blocks may be combined or otherwise performed in any order to implement the method 600 or an alternate method. Additionally, individual blocks may be deleted from the method 600 without departing from the spirit and scope of the present disclosure described herein. Furthermore, the method 600 may be implemented in any suitable hardware, software, firmware, or a combination thereof, that exists in the related art or that is later developed. The method 600 describes, without limitation, the implementation of the system 100. A person of skill in the art will understand that method 600 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system comprising:
   a processor;
   a memory coupled to the processor, wherein the memory comprises processor-executable instructions, which on execution, cause the processor to:
   receive an image of a plurality of objects;
   determine a plurality of feature layers and a plurality of feature cell sizes corresponding to the received image, based on an aspect ratio of the received image;
   determine an aspect ratio of one or more anchor boxes from a trained model file;
   determine, based on the aspect ratio of one or more anchor boxes, a position and a number of the one or more anchor boxes to be tiled in each feature cell of the plurality of feature layers, wherein the number of one or more anchor boxes to be tiled is based on the aspect ratio of the one or more anchor boxes and the plurality of feature cell sizes;
   assign the one or more anchor boxes as a horizontal tile or a vertical tile in each feature cell, when the anchor box aspect ratio is less than a first pre-defined threshold value and greater than a second pre-defined threshold value, respectively;
   generate one or more feature maps using an object detection model comprising a neural network (NN) model, wherein the one or more feature maps comprises one or more feature map tensors;
   generate, for each layer of the one or more feature maps, a prediction tensor of a pre-defined dimension, from the one or more feature map tensors, using a prediction convolution layer, wherein, for each layer of the one or more feature maps, the prediction convolution layer is created based on each feature cell size, the position of the one or more anchor boxes, and the aspect ratio of the one or more anchor boxes; and
   detect and classify the plurality of objects, based on the generated prediction tensor.

2. The system as claimed in claim 1, wherein the processor is further configured to:
   annotate the received one or more images, by creating one or more bounding boxes in the one or more images, using an annotation tool;
   compute an aspect ratio of the one or more bounding boxes, the plurality of feature layers, and the plurality of feature cell sizes, wherein the one or more bounding boxes may provide a point of reference information for an object detection, and wherein the point of reference information is captured using the annotation tool;
   determine, for the one or more bounding boxes, an aspect ratio of the one or more anchor boxes, and determine, based on the aspect ratio of the one or more anchor boxes, the position and the number of the one or more anchor boxes to be tiled in each feature cell of the plurality of feature layers, based on annotations from the annotation tool; and
   generate one or more feature maps using the neural network (NN) model and generate prediction tensor of the predefined dimension, using a prediction convolution layer;
   create a ground true tensor of a pre-defined dimension and assign an object class and location to the ground true tensor, upon assigning the one or more anchor boxes as the vertical tile or the horizontal tile in each feature cell;
   calculate a loss of classification of the object class, using the prediction tensor and the ground true tensor;
   transmit the calculated loss and learning rate to the prediction convolution layer and the neural network (NN) model to adjust trainable weight in the prediction convolution layer and the NN model; and export precise check point in trained data using the adjust trainable weight, to a model file.

3. The system as claimed in claim 1, wherein, for each feature layer of the generated feature map, the processor is further configured to:

create at least one of a depth-wise prediction convolution layer and a point-wise prediction convolution layer with an expand factor;

connect at least one of the depth-wise prediction convolution layer, and the point-wise prediction convolution layer to the one or more feature map tensor; and obtain the prediction tensor of pre-defined dimension for each feature layer.

4. The system as claimed in claim 1, wherein, for each anchor box of a different aspect ratio, when the anchor box aspect ratio is:

between the first pre-defined threshold value and the second pre-defined threshold value, the processor is further configured to:

assign an anchor-box at a center of the feature cell;

less than the first pre-defined threshold value or greater than the second pre-defined threshold value, the processor is further configured to:

assign a first anchor box with a center of the first anchor box to be on a left boundary of the feature cell, or on a top boundary of the feature cell, as the horizontal tile or the vertical tile, respectively;

assign subsequent additional anchor boxes as the vertical tile, until the anchor box is out of the feature cell;

move the center of a last anchor box tiled vertically within the feature cell, when the center of the last anchor box exceeds the right side of the feature cell and within a configured allowance ratio;

distribute overlapped anchor boxes among the additional anchor boxes tiled vertically; and discard the last anchor box, when the center of the last anchor box exceeds the right side of the feature cell, and is out of the configured allowance ratio.

5. The system as claimed in claim 1, wherein the processor is further configured to apply a non-maximum suppression (NMS) technique to suppress bad detected one or more bounding boxes.

6. The system as claimed in claim 1, wherein the one or more objects correspond to at least one of slim objects, and flat objects.

7. The system as claimed in claim 1, wherein the prediction tensor comprises values corresponding to the dimensions of the image, and the value is determined using the one or more anchor boxes.

8. The system as claimed in claim 1, wherein the received image is resized, by the processor, to a pre-defined aspect ratio, based on a width ratio and a height ratio of the image.

9. The system as claimed in claim 1, wherein the assigned one or more anchor boxes as the horizontal tile or the vertical tile in each feature cell are of same sizes.

10. A method comprising:

receiving, by a processor associated with a system, an image of a plurality of objects;

determining, by the processor, a plurality of feature layers and a plurality of feature cell sizes corresponding to the received image, based on an aspect ratio of the received image;

determining, by the processor, an aspect ratio of one or more anchor boxes from a trained model file;

determining, based on the aspect ratio of one or more anchor boxes, by the processor, a position and a number of the one or more anchor boxes to be tiled in each feature cell of the plurality of feature layers, wherein the number of one or more anchor boxes to be tiled is based on the aspect ratio of the one or more anchor boxes and the plurality of feature cell sizes;

assigning, by the processor, the one or more anchor boxes as a horizontal tile or a vertical tile in each feature cell, when the anchor box aspect ratio is less than a first pre-defined threshold value and greater than a second pre-defined threshold value, respectively;

generating, by the processor, one or more feature maps using an object detection model comprising a neural network (NN) model, wherein the one or more feature maps comprises one or more feature map tensors;

generating, by the processor, for each layer of the one or more feature maps, a prediction tensor of a pre-defined dimension, from the one or more feature map tensors, using a prediction convolution layer, wherein, for each layer of the one or more feature maps, the prediction convolution layer is created based on each feature cell size, the position of the one or more anchor boxes, and the aspect ratio of the one or more anchor boxes; and detecting, by the processor, and classifying the plurality of objects, based on the generated prediction tensor.

11. The method as claimed in claim 10, wherein the method further comprises:

annotating, by the processor, the received one or more images, by creating one or more bounding boxes in the one or more images, using an annotation tool;

computing, by the processor, an aspect ratio of the one or more bounding boxes, the plurality of feature layers, and the plurality of feature cell sizes, wherein the one or more bounding boxes may provide a point of reference information for an object detection, and wherein the point of reference information is captured using the annotation tool;

determining, by the processor, for the one or more bounding boxes, an aspect ratio of the of the one or more anchor boxes and determining, based on the aspect ratio of the one or more anchor boxes, a position and a number of the one or more anchor boxes to be tiled in each feature cell of the plurality of feature layers, based on annotations from the annotation tool; and generating, by the processor, one or more feature maps using the neural network (NN) model and generating the prediction tensor of the pre-defined dimension, using the prediction convolution layer;

creating, by the processor, a ground true tensor with dimension and assign an object class and location to the ground true tensor, upon assigning the one or more anchor boxes as the vertical tile or the horizontal tile in each feature cell;

calculating, by the processor, a loss of classification of the object class, using the prediction tensor and the ground true tensor;

transmitting, by the processor, the calculated loss and learning rate to the prediction convolution layer and the neural network (NN) model to adjust trainable weight in the prediction convolution layer and the NN model; and exporting, by the processor, a precise check point in trained data using the adjust trainable weight, to a model file.

12. The method as claimed in claim 10, wherein, for each feature layer of the generated feature map, the method further comprises:
creating, by the processor, at least one of a depth-wise prediction convolution layer and a point-wise prediction convolution layer with an expand factor;
connecting, by the processor, at least one of the depth-wise prediction convolution layer, and the point-wise prediction convolution layer to the one or more feature map tensor; and
obtaining, by the processor, the prediction tensor of the pre-defined dimension for each feature layer.

13. The method as claimed in claim 10, wherein,
for each anchor box of a different aspect ratio, when the anchor box aspect ratio is:
between the first pre-defined threshold value and the second pre-defined threshold value, the method further comprises:
assign an anchor-box at a center of the feature cell;
less than the first pre-defined threshold value or greater than the second pre-defined threshold value, the method further comprises:
assign a first anchor box with a center of the first anchor box to be on a left boundary of the feature cell, or on a top boundary of the feature cell, as the horizontal tile or the vertical tile, respectively;
assign subsequent additional anchor boxes as the vertical tile, until the anchor box is out of the feature cell;
move the center of a last anchor box tiled vertically within the feature cell, when the center of the last anchor box exceeds the right side of the feature cell and within a configured allowance ratio;
distribute overlapped anchor boxes among the additional anchor boxes tiled vertically; and
discard the last anchor box, when the center of the last anchor box exceeds the right side of the feature cell, and is out of the configured allowance ratio.

14. The method as claimed in claim 10, wherein the processor is further configured to apply a non-maximum suppression (NMS) technique to suppress bad detected one or more bounding boxes.

15. The method as claimed in claim 10, wherein the one or more objects correspond to at least one of slim objects, and flat objects.

16. The method as claimed in claim 10, wherein the prediction tensor comprises values corresponding to the dimensions of the image, and the value is determined using the one or more anchor boxes.

17. The method as claimed in claim 10, wherein the received image is resized, by the processor, to a pre-defined aspect ratio, based on a width ratio and a height ratio of the image.

18. The method as claimed in claim 10, wherein the assigned one or more anchor boxes as the horizontal tile or the vertical tile in each feature cell are of same sizes.

19. A non-transitory computer-readable medium comprising machine-readable instructions that are executable by a processor to:
receive an image of a plurality of objects;
determine a plurality of feature layers and a plurality of feature cell sizes corresponding to the received image, based on an aspect ratio of the received image;
determine an aspect ratio of one or more anchor boxes from a trained model file;
determine, based on the aspect ratio of one or more anchor boxes, a position and a number of the one or more anchor boxes to be tiled in each feature cell of the plurality of feature layers, wherein the number of one or more anchor boxes to be tiled is based on the aspect ratio of the one or more anchor boxes and the plurality of feature cell sizes;
assign the one or more anchor boxes as a horizontal tile or a vertical tile in each feature cell, when the anchor box aspect ratio is less than a first pre-defined threshold value and greater than a second pre-defined threshold value, respectively;
generate one or more feature maps using an object detection model comprising a neural network (NN) model, wherein the one or more feature maps comprises one or more feature map tensors;
generate for each layer of the one or more feature maps, a prediction tensor of a pre-defined dimension from the one or more feature map tensors, using a prediction convolution layer, wherein, for each layer of the one or more feature maps, the prediction convolution layer is created based on each feature cell size, the position of the one or more anchor boxes, and the aspect ratio of the one or more anchor boxes; and
detect and classify the plurality of objects, based on the generated prediction tensor.

20. The non-transitory computer-readable medium as claimed in claim 19, wherein the processor is further configured to:
annotate the received one or more images, by creating one or more bounding boxes in the one or more images, using an annotation tool;
compute an aspect ratio of the one or more bounding boxes, the plurality of feature layers, and the plurality of feature cell sizes, wherein one or more bounding boxes may provide a point of reference information for an object detection, and wherein the point of reference information is captured using the annotation tool;
determine, for the one or more bounding boxes, an aspect ratio of the of the one or more anchor boxes, and determine, based on the aspect ratio of the one or more anchor boxes, a position and a number of the one or more anchor boxes to be tiled in each feature cell of the plurality of feature layers, based on annotations from the annotation tool; and
generate one or more feature maps using the neural network (NN) model and generate the prediction tensor of the pre-defined dimension using the prediction convolution layer;
create a ground true tensor with dimension and assign an object class and location to the ground true tensor, upon assigning the one or more anchor boxes as the vertical tile or the horizontal tile in each feature cell;
calculate a loss of classification of the object class, using the prediction tensor and the ground true tensor;
transmit the calculated loss and learning rate to the prediction convolution layer and the neural network (NN) model to adjust trainable weight in the prediction convolution layer and the NN model; and
export a precise check-point in trained data using the adjust trainable weight, to a model file.

* * * * *